United States Patent
Fay et al.

(10) Patent No.: US 11,143,353 B2
(45) Date of Patent: Oct. 12, 2021

(54) SYSTEM AND METHOD FOR FIBER REINFORCED AEROGEL INSULATION

(71) Applicant: JOHNS MANVILLE, Denver, CO (US)

(72) Inventors: Ralph Michael Fay, Lakewood, CO (US); Stanislav Kukatin, Centennial, CO (US)

(73) Assignee: Johns Manville, Denver, CO (US)

( * ) Notice: Subject to any disclaimer, the term of this patent is extended or adjusted under 35 U.S.C. 154(b) by 37 days.

(21) Appl. No.: 16/790,958

(22) Filed: Feb. 14, 2020

(65) Prior Publication Data

US 2020/0182394 A1 Jun. 11, 2020

Related U.S. Application Data

(63) Continuation of application No. 16/129,259, filed on Sep. 12, 2018, now Pat. No. 10,612,717.

(51) Int. Cl.
| | |
|---|---|
| *F16L 59/14* | (2006.01) |
| *B01J 13/00* | (2006.01) |
| *F16L 59/065* | (2006.01) |
| *B32B 27/36* | (2006.01) |
| *C09K 21/00* | (2006.01) |

(52) U.S. Cl.
CPC ......... *F16L 59/141* (2013.01); *B01J 13/0091* (2013.01); *F16L 59/065* (2013.01); *B32B 27/36* (2013.01); *B32B 2262/101* (2013.01); *B32B 2307/304* (2013.01); *B32B 2307/3065* (2013.01); *C09K 21/00* (2013.01)

(58) Field of Classification Search
CPC .... F16L 59/141; F16L 59/065; B01J 13/0091; B32B 37/36; B32B 2262/101; B32B 2307/304; B32B 2307/3065; C09K 21/00
USPC ........................... 138/137, 140, 141, DIG. 2
See application file for complete search history.

(56) References Cited

U.S. PATENT DOCUMENTS

| | | | |
|---|---|---|---|
| 4,307,053 A ‡ | 12/1981 | Daws et al. | |
| 4,310,585 A ‡ | 1/1982 | Shannon | |
| 5,569,513 A | 10/1996 | Fidler et al. | |
| 6,403,180 B1 | 6/2002 | Barrall | |
| 7,159,836 B2 ‡ | 1/2007 | Parks et al. | |
| 7,997,541 B2 | 8/2011 | Pothanikat et al. | |

(Continued)

*Primary Examiner* — Craig M Schneider
*Assistant Examiner* — David R Deal
(74) *Attorney, Agent, or Firm* — Robert D. Touslee

(57) ABSTRACT

A fiber reinforced insulation product may include a first layer of fiber reinforced aerogel composite and a second layer of fiber reinforced aerogel composite. The first layer may include entangled fibers, aerogel particles dispersed within the entangled fibers, and a first binder that may form a first binding framework that bonds the entangled fibers and the aerogel particles of the first layer together. The second layer may include entangled fibers, aerogel particles dispersed within the entangled fibers, and a second binder that may form a second binding framework that bonds the entangled fibers and the aerogel particles of the second layer together. The fiber reinforced insulation product may further include a third binder that may form a third binding framework that bonds the first layer and the second layer together. The third binder may be dispersed throughout the first layer and the second layer.

27 Claims, 10 Drawing Sheets

(56) References Cited

U.S. PATENT DOCUMENTS

| | | | |
|---|---|---|---|
| 9,878,405 B2 | 1/2018 | Kim et al. | |
| 10,042,092 B2 | 8/2018 | Wada et al. | |
| 10,384,420 B2 | 8/2019 | Hisatake et al. | |
| 2006/0272727 A1 | 12/2006 | Dinon et al. | |
| 2008/0311398 A1* | 12/2008 | Bauer .................... | C09D 11/03 428/402 |
| 2010/0005860 A1 | 1/2010 | Coudray et al. | |
| 2011/0197987 A1 | 8/2011 | Koravos et al. | |
| 2011/0240166 A1 | 10/2011 | Collier et al. | |
| 2013/0186504 A1 | 7/2013 | Maffei | |
| 2018/0022059 A1‡ | 1/2018 | Dill et al. | |
| 2018/0044561 A1‡ | 2/2018 | Goletto | |
| 2018/0105472 A1 | 4/2018 | Ahn et al. | |
| 2018/0134566 A1 | 5/2018 | Kim et al. | |

\* cited by examiner
‡ imported from a related application

C-C

SYSTEM AND METHOD FOR FIBER REINFORCED AEROGEL INSULATION

CROSS-REFERENCE TO RELATED APPLICATIONS

This application is a continuation of pending U.S. application Ser. No. 16/129,259 filed Sep. 12, 2018 entitled SYSTEM AND METHOD FOR FIBER REINFORCED AEROGEL INSULATION. This application is related to U.S. Patent Application entitled "SYSTEMS AND METHODS FOR INSULATING A PIPE WITH A PRE-APPLIED VAPOR-BARRIER STOP" filed Sep. 12, 2018, U.S. application Ser. No. 16/128,692; U.S. Patent Application entitled "FIBER REINFORCED AEROGEL INSULATION" filed Sep. 12, 2018, U.S. application Ser. No. 16/128,886; and U.S. Patent Application entitled "FIBER REINFORCED AEROGEL INSULATION AND METHOD THEREFOR" filed Sep. 12, 2018, U.S. application Ser. No. 16/129,005. The entire disclosure of all of the aforementioned U.S. Patent Applications are hereby incorporated by reference, for all purposes, as if fully set forth herein.

BACKGROUND OF THE INVENTION

This invention relates generally to insulation products. More specifically the invention relates to fiber reinforced aerogel-containing insulation products.

BRIEF DESCRIPTION OF THE INVENTION

The embodiments described herein relate to systems and methods for fiber reinforced aerogel insulation. In some embodiments, a fiber reinforced insulation product for insulation may include a first layer of fiber reinforced aerogel composite and a second layer of fiber reinforced aerogel composite. The first layer may include a plurality of entangled fibers, aerogel particles that may be dispersed within the plurality of entangled fibers, and a first binder that may form a first binding framework that bonds the plurality of entangled fibers and the aerogel particles of the first layer together. The second layer may include a plurality of entangled fibers, aerogel particles that may be dispersed within the plurality of entangled fibers, and a second binder that may form a second binding framework that bonds the plurality of entangled fibers and the aerogel particles of the second layer together. The fiber reinforced insulation product may further include a third binder that may form a third binding framework that bonds the first layer and the second layer together. The third binder may be dispersed throughout the first layer and the second layer.

In some embodiments, the first layer or the second layer may include between about 50 wt. % and about 80 wt. % of aerogel particles. In some embodiments, the first layer or the second layer may include about 75 wt. % of aerogel particles. In some embodiments, the fiber reinforced insulation product may include a density between about 5.5 pcf and about 8 pcf. In some embodiments, the first layer may include coarse glass fibers that may have an average fiber diameter between about 6 µm and about 13 µm. In some embodiments, the first layer may further include glass microfibers that may have an average fiber diameter between about 0.5 µm and about 3 µm homogenously dispersed within the coarse glass fibers. The aerogel particles may be homogenously dispersed within the coarse glass fibers and the glass microfibers. In some embodiments, the first and subsequent layer(s) may include about 20 wt. % of glass fibers. In some embodiments, the first layer and subsequent layer(s) may include about 10 wt. % of glass microfibers, and the second layer may include about 10 wt. % of coarse glass fibers.

In some embodiments, the fiber reinforced insulation product may include a non-uniform concentration of aerogel particles across a thickness dimension of the fiber reinforced insulation product. In some embodiments, the fiber reinforced insulation product may include a greater concentration of aerogel particles approximate an interface between the first layer and the second layer than elsewhere in the fiber reinforced insulation product.

In some embodiments, the first binder may include a binding agent of bicomponent fibers. In some embodiments, the first binder may include polyvinyl alcohol. In some embodiments, the first binder and the second binder may be the same. In some embodiments, the first layer may include a thickness between about 1 mm and about 10 mm. In some embodiments, the fiber reinforced insulation product may have a thickness between about 20 mm and about 100 mm.

In some embodiments, a method for producing a pipe insulation product may include providing a first mat of fiber reinforced aerogel composite and a second mat of fiber reinforced aerogel composite. The first mat may have a first density, and the second mat may have a second density. The method may further include forming an insulation product of fiber reinforced aerogel composite from the first mat and the second mat. The insulation product may have a third density. The third density may be greater than the first density and the second density. A ratio of the third density to the first density or the second density may be between about 1.2:1 and about 2:1.

In some embodiments, the first density or second density may be between about 4 pcf and about 5 pcf, and the third density may be between about 6 pcf and about 8 pcf. In some embodiments, the first or second mat may include a thickness between about 1 mm and about 10 mm.

In some embodiments, providing the first mat of fiber reinforced aerogel composite or the second mat of fiber reinforced aerogel composite may include providing an aqueous solution. The aqueous solution may include aerogel particles and fibers. The aerogel particles and the fibers may be uniformly dispersed in the aqueous solution to form a slurry. In some embodiments, providing the first mat of fiber reinforced aerogel composite or the second mat of fiber reinforced aerogel composite may further include transferring the slurry onto a porous surface, and removing water from the slurry to form a wet laid material mixture of the aerogel particles and the fibers atop the porous surface.

In some embodiments, providing the first mat of fiber reinforced aerogel composite or the second mat of fiber reinforced aerogel composite may further include curing the wet laid material mixture to bond the fibers and the aerogel particles together to form the first or second mat. In some embodiments, providing the first mat of fiber reinforced aerogel composite or the second mat of fiber reinforced aerogel composite may further include applying additional aerogel particles to the top of the wet laid material mixture of the aerogel particles and the fibers. In some embodiments, the first or second mat may include between about 65 wt. % and about 80 wt. % of the aerogel particles, and the insulation product may include between about 50 wt. % and about 75 wt. % of the aerogel particles.

In some embodiments, the fibers may include bicomponent fibers, and providing the aqueous solution may include vortex mixing the aerogel particles and the bicomponent fibers in the aqueous solution. In some embodiments, forming the insulation product of fiber reinforced aerogel composite may include heating adjacent surfaces of the at least two layers of the mat such that a binding agent of the bicomponent fibers may be activated, and compressing the adjacent surfaces of the at least two layers of the mat towards each other such that the at least two layers may form a laminate.

In some embodiments, the fibers may further include glass fibers. In some embodiments, the fibers may include coarse glass fibers. In some embodiments, the fibers may further include glass microfibers.

In some embodiments, providing the first mat of fiber reinforced aerogel composite or the second mat of fiber reinforced aerogel composite may further include adding a binder to the wet laid material mixture. In some embodiments, the binder may include polyvinyl alcohol. In some embodiments, forming the insulation product of fiber reinforced aerogel composite may include reactivating the binder by wetting the binder, compressing the first mat and the second mat after reactivating the binder, and curing the reactivated binder to bond the first mat and the second mat together.

In some embodiments, forming the insulation product of fiber reinforced aerogel composite may include dipping the first or second mat into a liquid binder such that the mat may be saturated with the liquid binder. In some embodiments, the first mat and the second mat may be portions of a continuous mat. Forming the insulation product of fiber reinforced aerogel composite may include winding the first or second mat around a mandrel to form compressed, overlapping layers of the first or second mat about the mandrel, and curing the layers of the first or second mat around the mandrel such that the liquid binder cures to maintain the compressed state of the layers of the first or second mat and to bond adjacent surfaces of the overlapping layers of the first or second mat. In some embodiments, forming the insulation product of fiber reinforced aerogel composite stacking multiple layers of the first or second mat saturated with the liquid binder, winding the stacked layers of the first or second mat around a mandrel to compress the stacked layers of the first or second mat, and curing the stacked layers around the mandrel such that the liquid binder cures to maintain the compressed state of the layers of the first or second mat and to bond adjacent surfaces of the stacked layers of the first or second mat. In some embodiments, forming the insulation product of fiber reinforced aerogel composite may include stacking multiple layers of the first or second mat saturated with the liquid binder, compressing the stacked layers into a mold, and curing the stacked layers inside the mold such that the liquid binder cures to maintain the compressed state of the layers of the first or second mat and to bond adjacent surfaces of the stacked layers of the first or second mat.

In some embodiments, providing the first mat of fiber reinforced aerogel composite or the second mat of fiber reinforced aerogel composite may further include adding a binder to the wet laid material mixture. Forming the insulation product of fiber reinforced aerogel composite may include compressing the first mat of fiber reinforced aerogel composite and the second mat of fiber reinforced aerogel composite, and curing the binder to bond the first mat of fiber reinforced aerogel composite and the second mat of fiber reinforced aerogel composite.

In some embodiments, a method for producing an insulation product may include providing a mat of fiber reinforced aerogel composite. The mat may have a first density. The method may further include forming an insulation product of fiber reinforced aerogel composite from the mat of fiber reinforced aerogel composite and at least one additional mat of fiber reinforced aerogel composite. The insulation product may have a second density that may be greater than the first density by at least about 40%.

In some embodiments, the mat may include about 10 wt. % more aerogel than the insulation product. In some embodiments, providing the mat of fiber reinforced aerogel composite may further include providing an aqueous solution that may include aerogel particles, glass fibers, and a binder. The aerogel particles, the glass fibers, and the binder may be uniformly dispersed in the aqueous solution to form a slurry. Providing the mat of fiber reinforced aerogel composite may further include pouring the slurry onto a porous surface, and removing water from the slurry to form a wet laid material mixture atop the porous surface. In some embodiments, the glass fibers have an average diameter of 8 microns and an average length of 8 mm. In some embodiments, the method may further include curing the wet laid material mixture such that the binder cures to bond the aerogel particles and the glass fibers together to form the mat.

In some embodiments, forming the insulation product of fiber reinforced aerogel composite from the mat of fiber reinforced aerogel composite may include winding the mat around a mandrel to form compressed, overlapping layers of the mat about the mandrel, and curing the layers of the mat around the mandrel such that the binder cures to maintain the compressed state of the layers of the mat and to bond adjacent surfaces of the overlapping layers of the mat.

In some embodiments, the binder in the aqueous solution may be a first binder, and forming the insulation product of fiber reinforced aerogel composite from the mat of fiber reinforced aerogel composite may include re-saturate the mat with a second binder by curtain coating or dipping the mat into the second binder. In some embodiments, forming the insulation product of fiber reinforced aerogel composite from the mat of fiber reinforced aerogel composite may include winding the mat around a mandrel to form compressed, overlapping layers of the mat about the mandrel, and curing the layers of the mat around the mandrel such that the second binder cures to maintain the compressed state of the layers of the mat and to bond adjacent surfaces of the overlapping layers of the mat. In some embodiments, forming the insulation product of fiber reinforced aerogel composite from the mat of fiber reinforced aerogel composite may include stacking multiple layers of the mat saturated with the liquid binder, compressing the stacked layers into a mold, and curing the stacked layers inside the mold such that the second binder cures to maintain the compressed state of the layers of the mat and to bond adjacent surfaces of the stacked layers of the mat.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

"ASTM" refers to American Society for Testing and Materials and is used to identify a test method by number. The year of the test method is either identified by suffix following the test number or is the most recent test method prior to the priority date of this document.

Described below are various insulation products formed from aerogel particles and reinforcing fibers. The various insulation products may be pre-applied with facers that not only improve structural and thermal properties, but also allow for quick installation in the field. The insulation products offer excellent thermal performance for cryogenic, cold, or warm temperature applications, but can also be used for high temperature applications.

Figure 1A:
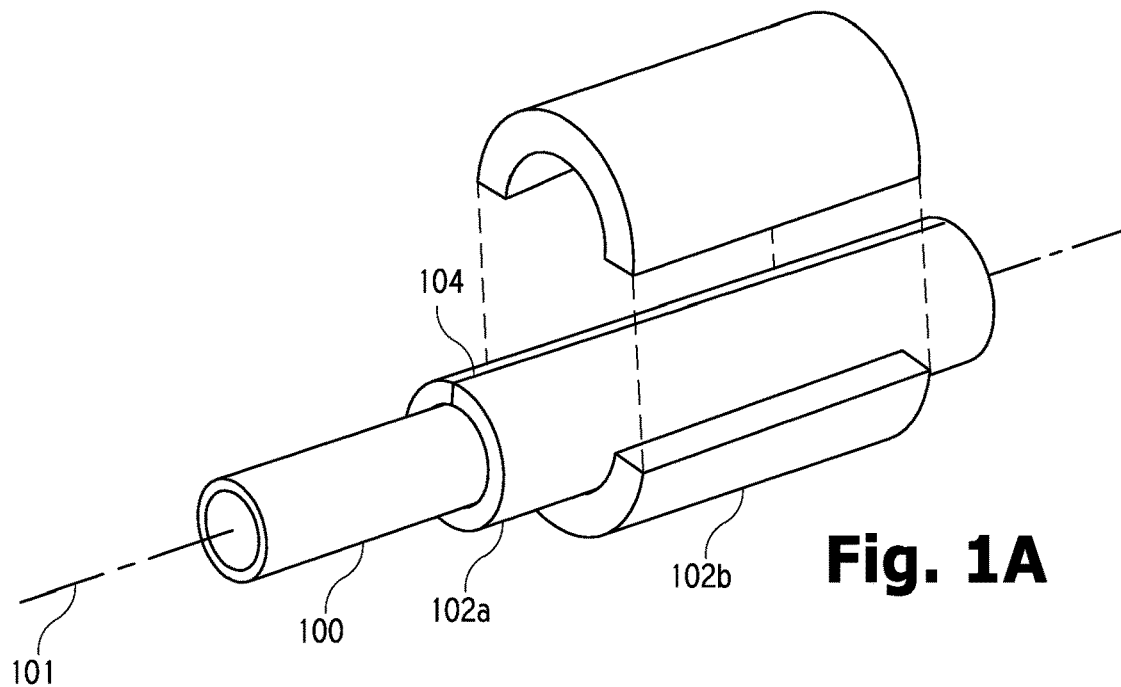
FIGS. 1A and 1B schematically illustrate perspective views of a pipe with insulation product positioned about the pipe.
Figure 1B:
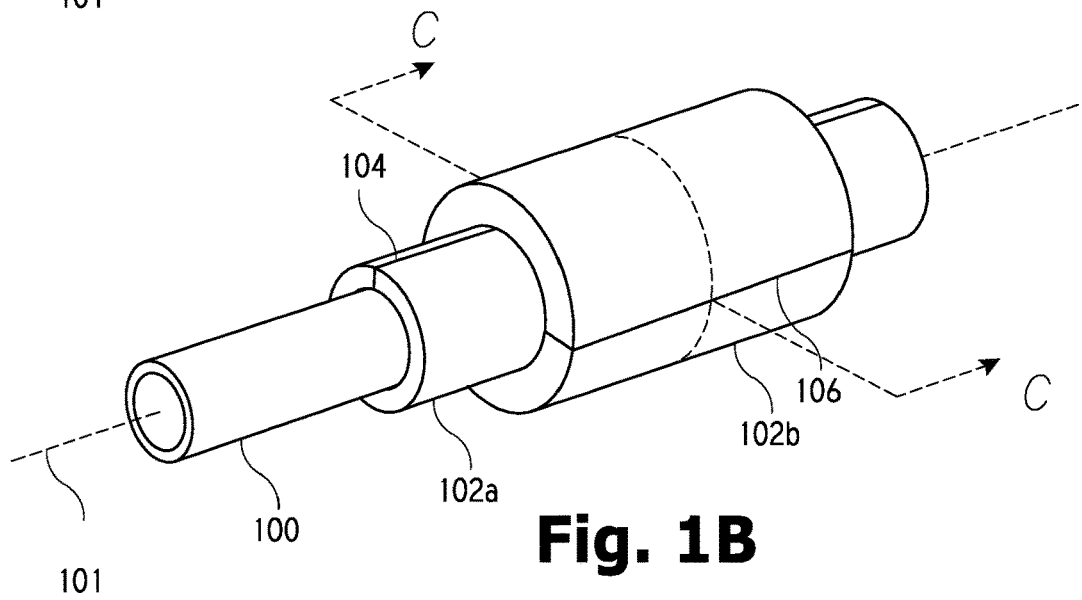
Figure 1C:
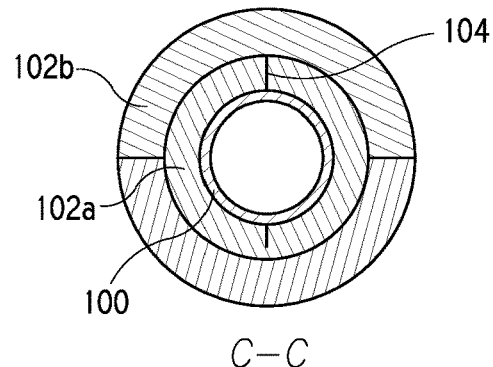
FIG. 1C illustrates a cross sectional view taken along line C-C of FIG. 1B.

FIGS. 1A and 1B illustrate perspective views of a portion of a pipe 100 with one or more layers 102 of an insulation product positioned about the pipe 100. In FIG. 1A, a section of the insulation product is shown in a partially disassembled state, and in FIG. 1B, the layers 102 are assembled around the pipe section 100. FIG. 1C illustrates a cross sectional view taken along line C-C of FIG. 1B. Although two insulation layers 102, i.e., an inner layer 102a of the insulation product and an outer layer 102b of the insulation product, are shown, depending on the particular application, the size and/or construction of the pipe 100 and/or each layer 102 of the insulation product, more or fewer layers 102 of the insulation product may be utilized.

The pipe 100 may be a cylindrical pipe or tubing having a longitudinal axis 101. The pipe 100 may be made of suitable materials for transporting fluids at relatively low temperatures. For example, the pipe 100 may transport fuel and/or chemicals, such as liquefied natural gas, ethylene, ammonia, nitrogen, hydrogen, or other fluids in their respective liquid states, and thus at various temperatures within or below the refrigeration temperature range or the cryogenic temperature range, such as below about 100° F., below about 0° F., below about −100° F., below about −200° F., below about −300° F., below about −400° F., or lower. For example, the insulated pipe 100 may transport liquefied natural gas at about −260° F., liquefied ethylene at about −155° F., liquefied ammonia at about −28° F., etc. Although a straight section of the pipe 100 is shown, the entire pipe system for transporting the fluids may include fittings for connecting straight pipe sections and/or other components for regulating the flow of the fluids. As will be described in more detail below, the insulation product may be preformed into any suitable shapes and sizes, such as by molding and/or various other manufacturing methods, such that layers or other shapes or forms of the insulation product may be installed onto pipe sections, fittings, and/or other components of the pipe system with minimal fabrication at the installation site.

Figure 1D:
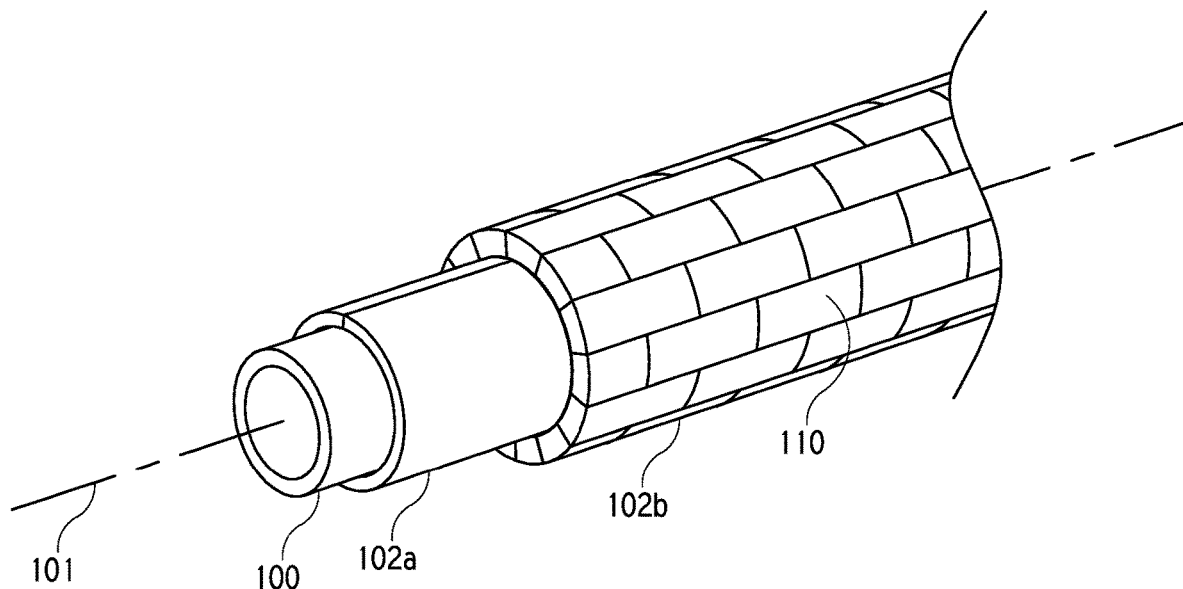
FIG. 1D schematically illustrates a perspective view of another pipe with insulation product positioned about the pipe.

The layers 102 of the insulation product may each be formed as a cylindrical body. Depending on the size and/or shape of the pipe 100, each layer 102 may be formed as a unitary or integral piece of the insulation product or may be formed by joining multiple pieces or sections of the insulation product. When fewer number of pieces are involved in forming an insulation layer 102 surrounding the pipe 100 or an adjacent inner layer 102, the installation time may be reduced. However, as the size of the pipe 100 increases, the layers 102 of the insulation product may be formed by joining multiple smaller pieces together, such as shown in FIG. 1D. The smaller pieces can be more efficiently stored and transported.

With reference to FIG. 1A, the inner layer 102a may be formed as a single or one-piece body, such a clamshell of two cylindrical halves joined by a hinge area. When installed onto the pipe 100, the clamshell closes about the pipe 100. The abutting longitudinal edges of the two cylindrical halves may define a longitudinal seam or joint 104 substantially parallel to the longitudinal axis 101 of the pipe 100. The longitudinal joint 104 may be sealed by sealants, adhesives, tapes, or any suitable sealing mechanism. The outer layer 102b may be formed by joining two separate cylindrical halves. FIG. 1A shows one of the cylindrical halves as positioned away from the nested inner layer 102a. When fitted around the pipe 100, or more specifically, around the inner layer 102a as shown in FIG. 1B, the abutting longitudinal edges of the two cylindrical halves of the outer layer 102b may form two longitudinal seams or joints 106 substantially parallel to the longitudinal axis 101 of the pipe 100, which may be sealed by sealants, adhesives, tapes, or any suitable sealing mechanism. In some embodiments, the inner layer 102a may be formed by joining longitudinal edges of two separate cylindrical halves, instead of a one-piece clamshell structure. In some embodiments, the outer layer 102b may be formed as a one-piece clamshell structure.

As can be seen from FIG. 1A, the longitudinal joints 106 of the outer layer 102b and the longitudinal joints 104 of the inner layer 102a may be rotationally offset from each other with respect to the longitudinal axis 101 of the pipe 100, and thus not overlap. In the embodiment of FIG. 1A, the longitudinal joints 106 of the outer layer 102b may be rotationally offset from the longitudinal joint 104 of the inner layer 102a by about 90 degrees. The longitudinal joints of adjacent layers 102 may be offset by other appropriate angles in various embodiments. For example, the offset angle may be at least about 1/5, at least about 1/4, at least about 1/3, or at least about 1/2 of the angle defined by the circumferential extension of the insulation product pieces forming each layer 102, such as the cylindrical halves or sections of FIG. 1A or the curved sections of FIG. 1D forming the outer layer 102b as described below.

FIG. 1A illustrates only one clamshell body of the inner layer 102a covering a portion of the longitudinal extension of the pipe 100, but the inner layer 102a may include multiple clamshell bodies axially placed along the longitudinal extension of the pipe 100 in an abutting manner. The abutting ends or edges of the clamshell bodies may form circumferential seams or joints which may be sealed by sealants, adhesives, tapes, or any suitable sealing mechanism. Similarly, the outer layer 102b may include additional cylindrical halves axially placed along the longitudinal extension of the inner layer 102a in an abutting manner. The abutting ends or edges of the cylindrical halves may form circumferential seams or joints which may be sealed by sealants, adhesives, tapes, or any suitable sealing mechanism.

As can be seen from FIG. 1A, the circumferential joints formed by the pieces of the outer layer 102b may be offset from the circumferential joints formed by the pieces of the inner layer 102a. In some embodiments, the upper cylindrical halves of the outer layer 102b shown in FIG. 1A may be further axially offset from the lower cylindrical halves. Consequently, the circumferential joints formed by the abutting edges of the upper cylindrical halves may be also axially offset from the circumferential joints formed by the lower cylindrical halves. In some embodiments, adjacent pairs of upper and lower cylindrical halves of the outer layer 102b may be rotationally offset from each other such that the longitudinal joints of adjacent pairs of upper and lower cylindrical halves may be rotationally offset from each other. Similarly, the adjacent clamshells of the insulation layer 102 may be placed such that the longitudinal joints of the adjacent clamshells may be rotationally offset from each other. The term circumferential or circumference used herein may refer to the entire circular periphery of the pipe 100 or the insulation layer 102, or may refer to only a portion of the circular periphery of the pipe 100 or the insulation layers 102, such as an arc or a segment of the circular periphery as defined by the insulation pieces forming the insulation layers 102. Further, the pipe 100 and/or the insulation layer 102 may be cylindrical as shown in FIG. 1A, but may be formed of any other suitable shapes, such as an oval or polygonal shape. Accordingly, the term circumferential or circumference used herein may refer to the periphery, or portions thereof, of any shape the pipe 100 or insulation layer 102 may be formed of, which may include straight or curved peripheral portions.

Figure 1E:
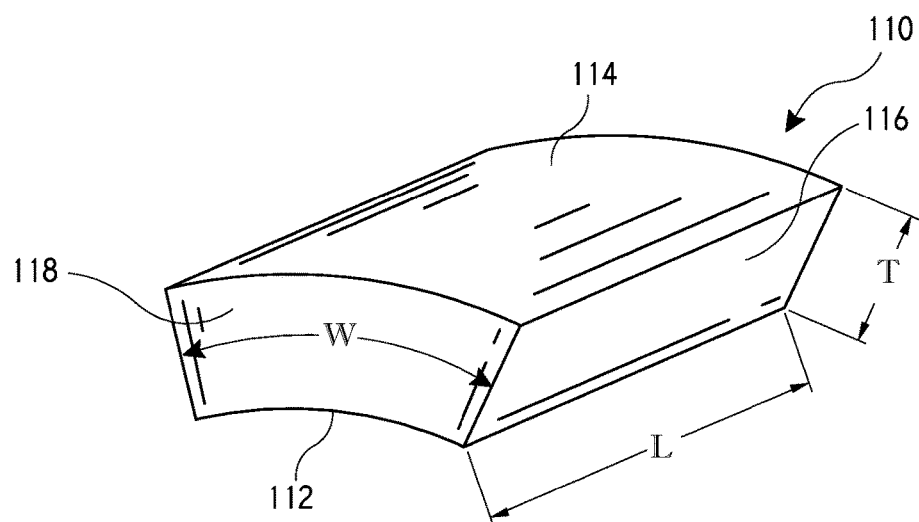
FIG. 1E schematically illustrates a perspective view of one section of insulation product.

As the size of the pipe 100 and/or the insulation layer 102 increases, the insulation layer 102 may be formed by joining multiple relatively small segments or sections of the insulation product as shown in FIG. 1D. Although only two insulation layers 102, i.e., the inner layer 102a and the outer layer 102b are shown, more or less layers 102 may be implemented. FIG. 1E illustrates one section 110 of the insulation product. The insulation product section 110 includes an inner surface 112, an outer surface 114, two opposing longitudinal sides or ends 116, and two opposing circumferential sides or ends 118. The distance between the inner surface 112 and the outer surface 114 defines a thickness T of the insulation product section 110. The distance between the two longitudinal sides 116 defines a width W of the insulation product section 110. The distance between the two circumferential sides 118 defines a length L of the insulation product section 110.

The inner surface 112 and the outer surface 114 may be parallel to each other, and thus define a uniform thickness T of the insulation product section 110. The thickness T may range between about 0.5 inches and about 2 inches, between 0.75 inches and about 1.5 inches, or between about 1 inch and about 1.25 inches in various embodiments. The insulation product section 110 may also be made with a thickness T greater than 2 inches or less than 0.5 inches. The two circumferential sides 118 of the insulation production section 110 may be parallel to each other, and thus define a uniform length L of the insulation product section 110. The insulation product section 110 may have a typical length L of about 36 inches, but other length dimensions may be adopted.

Depending on the shape of the pipe section or components surrounded by the insulation product section 110, the inner surface 112 and the outer surface 114 may include two curved surfaces each respectively forming a portion of one of two co-axially aligned cylindrical surfaces about the longitudinal axis 101 of the pipe 100. The insulation product section 110 may include a varying width W. For ease of discussion, the width W of the insulation product section 110 may be defined as the arc length measured at the mid-point of the thickness T of the insulation product section 110. The ratio of the length L to the width W of the insulation product section 110 may be at least about 1:1, at least about 1.5:1, at least about 2:1, at least about 3:1, or greater, and the ratio of the width W to the thickness T of the insulation product section 110 may be at least about 1:1, at least about 2:1, at least about 3:1, at least about 4:1, at least about 5:1, at least about 6:1, or greater to effectively utilize storage space during transportation, while maintaining sufficient structural integrity of the insulation product sections 110 for ease of handling during installation.

Similar to the embodiment shown in FIG. 1A, when joined together to form the insulation layers 102, each insulation product section 110 may be axially or rotationally offset from an adjacent insulation product section 110. Consequently, the longitudinal joints formed by adjacent insulation product sections 110 of one insulation layer 102 may be rotationally offset from the longitudinal joints formed by adjacent insulation product sections 110 of adjacent inner and/or outer insulation layers 102, and the circumferential joints formed by adjacent insulation product sections 110 of one insulation layer 102 may also be axially offset from the circumferential joints formed by adjacent insulation product sections 110 of adjacent inner and/or outer insulation layers. The longitudinal and/or circumferential joints formed by the insulation product sections 110 within each insulation layer 102 may be further offset from each other. The offset arrangement of the seams or joints minimizes or substantially prevents vapor condensation travelling cross the layers 102.

As will be discussed in more detail below, the insulation product pieces forming the insulation layers 102, such as the clamshells, the cylindrical halves, or the cylindrical sections described herein, may be pre-fabricated with inner and/or outer facers. The inner facer may include a woven or nonwoven layer, and the outer facer may include a vapor barrier facer. The facers may improve the structural integrity of the insulation pieces and may minimize dust that may be generated during transportation and installation. The insulation pieces may further include joining or sealing tapes along the edges of the insulation pieces or other pre-applied adhesives that may be quickly activated in the field. The pre-fabricated facers and sealing mechanisms allow for quick installation and reduce overall cost of the insulation system.

In the entire piping system, for every predetermined length of a straight pipe section, vapor barrier stops may be applied to prevent any moisture trapped between the pipe 100 and the insulation layers 102 from travelling axially for an extended distance. FIG. 1D illustrates an end portion of one such predetermined length of the straight pipe section. At the end portion, the circumferential end of the inner layer 102a and the circumferential end of the outer layer 102b may be axially offset from each other with the circumferential end of the inner layer 102a extending beyond the circumferential end of the outer layer 102b. A vapor barrier stop may be applied along the stepped profile defined by the pipe 100, the inner layer 102a, and the outer layer 102b. A more thorough or complete description of the vapor barrier stop is provided in U.S. Patent Application entitled "SYSTEMS AND METHODS FOR INSULATING A PIPE WITH A PRE-APPLIED VAPOR-BARRIER STOP", which is previously incorporated by reference.

Figure 2:
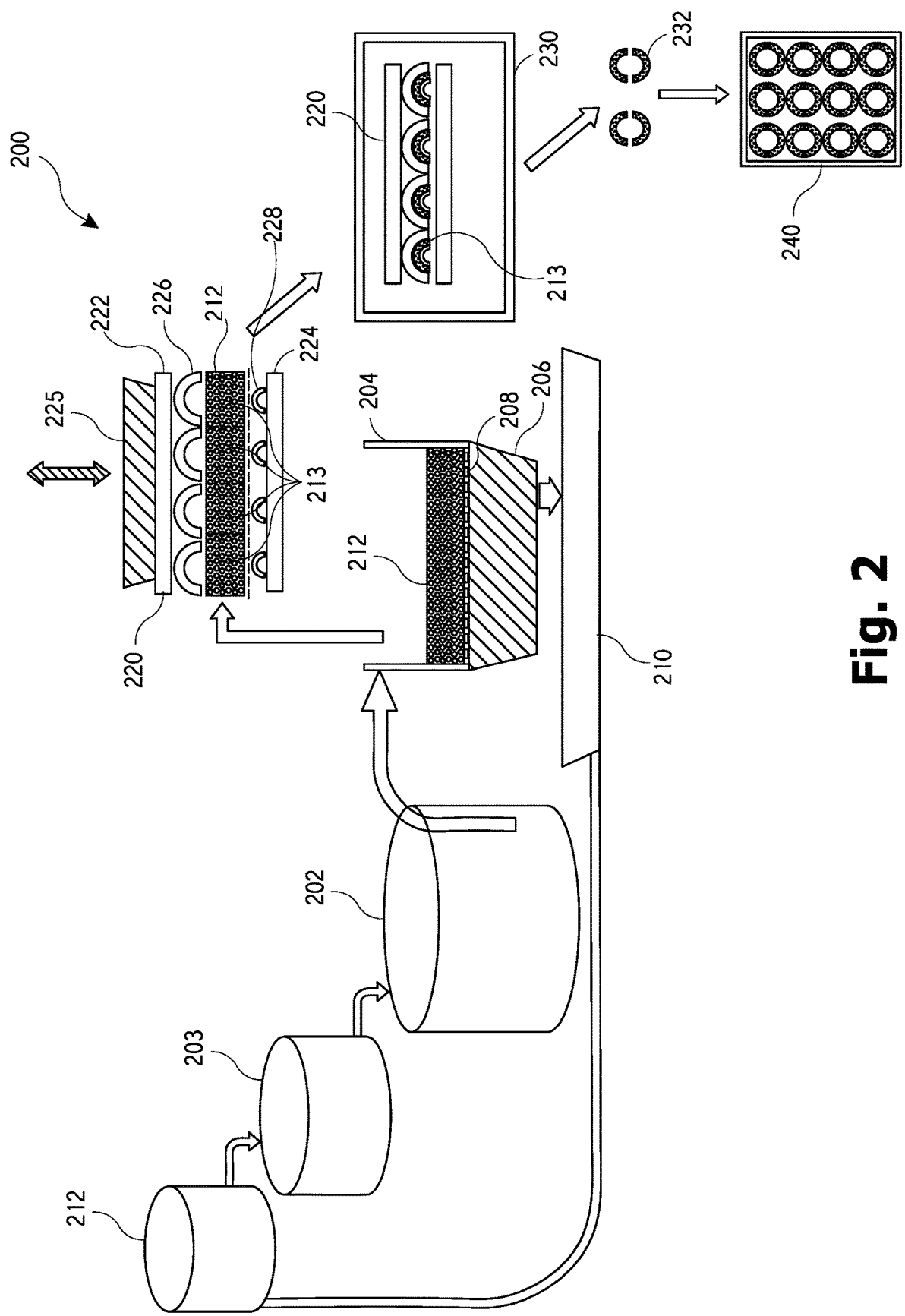
FIG. 2 schematically illustrates an exemplary system for forming an insulation product.

FIG. 2 schematically illustrates a system 200 for forming an insulation product that may be used to form insulation layers for pipes as discussed above with reference to FIGS. 1A-1E. The system 200 includes a mixing chamber 202, such as a hydro pulper for mixing aerogel particles, reinforcing fibers, a binder, and various additives, including a water repellent additive, in an aqueous solution (also referred to as whitewater) to form a slurry. Various mixing or blending techniques, including paddle wheel mixing, may be utilized. Vortex mixing may also be utilized to blend the ingredients together without being mechanically abusive to the ingredients, such as breaking the fibers into shorter lengths or grinding the aerogel into finer particles. In some embodiments, recycled insulation product particles may also be added to the whitewater solution for forming the mixture as will be discussed below. To maintain the uniform or homogenous distribution of the various ingredients in the mixture, the mixture may be used soon after the desired uniformity is achieved, such as within minutes, so that the mixture does not begin to separate or settle and become non-uniform.

The whitewater may include surfactants and viscosity modifiers, similar to the whitewater used to manufacture nonwoven glass mats such as described in U.S. Pat. No. 10,003,056, the entire disclosure of which is hereby incorporated by reference. The whitewater may facilitate the even distribution of the ingredients in the slurry. The whitewater may be fed into the mixing chamber 202 from a whitewater container 203, which may be used to prepare the whitewater solution using in part recycled whitewater as will be described in more detail below.

The aerogel particles are synthetic highly porous and ultralight weight materials. The aerogel particles are typically made through a sol-gel process, although any other process of forming the aerogel particles known in the art may be employed. The aerogel particles are excellent thermal insulators due to being extremely light weight, low density (i.e., 98% air), and having extremely small pore sizes, which typically are between 10 nm and 40 nm. The nano-sized pores of the aerogel particles enable the aerogel particles to exhibit low thermal conductivity by essentially eliminating convection and gas conduction heat or thermal energy transfer. In some embodiments, the aerogel particles used for making the insulation product may include hydrophobic silica aerogel particles. In some embodiments, the aerogel particles may also include various other materials, such as organic aerogels, polyimide aerogel, polyurethane aerogel, and the like. A more thorough or complete description of the aerogel particles is provided in U.S. patent application Ser. No. 15/804,834, the entire disclosure of which is hereby incorporated by reference.

Depending on the applications, the formed insulation product may include between about 50 wt % and about 75 wt % of the aerogel particles in the finished molded product. The aerogel particles may have a particle size or diameter between about 10 and 4,000 microns. In some embodiments, the aerogel particles used for forming the insulation product may have a particle size or diameter between 25 and 500 microns, or between 50 and 300 microns, or between 100 and 200 microns. Various other particle sizes for the aerogel particles may likewise be employed. A particle size of between 100 and 200 microns may enable the aerogel particles to be easily dispersed within a whitewater solution and allow the water to be easily drained during the formation of the insulation product. The aerogel particles may be hydrophobic, which enables the aerogel particles to be directly added to water in the insulation product formation process without the water, or other materials in the water, plugging the pores of the aerogel particles. If the pores of the aerogel particles are plugged, the desired insulative properties may be negated or eliminated.

The reinforcing fibers may include organic or inorganic fibers. The inorganic fibers improve fire resistance property of the insulation product. In some embodiments, the inorganic fibers may include glass fibers. The glass fibers may include a mixture of coarse glass fibers and glass microfibers. The coarse glass fibers may have an average fiber diameter between about 8 microns and about 20 microns. The average fiber length of the coarse glass fibers may range between about ¼ inches and about 1 to about 1¼ inches. In some embodiments, wet chop E glass fibers having an average fiber diameter of about 13 microns at about ¾ inch length may be used for the insulation product. The glass microfibers may have an average fiber diameter between about 0.5 microns and about 3 microns. The length of the glass microfibers may range between about ⅛ inches and about 6 inches, more typically between about ⅛ inches and about 4 inches. In some embodiments, dry glass microfibers having an average fiber diameter of about 0.8 microns at about 20 microns length may be used for the insulation product.

The mixture of the coarse glass fibers and glass microfibers used for forming the insulation product may have a ratio of the coarse glass fiber diameter to the glass microfiber diameter between 40:1 and between 5:1, such as about 30:1, about 20:1, about 16.25:1, about 15:1, or about 10:1 in various embodiments. Depending on the applications, the insulation product may include between about 1 wt. % and about 6 wt. % of the coarse glass fibers, such as 3 wt. % of the coarse glass fibers, and include between about 5 wt. % and about 15 wt. % of the glass microfibers, such as 10 wt. % of the glass microfibers. The ratio of the weight of the coarse glass fibers in the formed insulation product to the weight of the glass microfibers may range between about 2:3 and about 1:3, such as about 3:10. Small additions of coarse fiber can significantly improve tensile and tear resistant in mats made predominately with glass microfibers. Glass microfibers can form interconnected webs or network that can hold or trap small particles, such as aerogel particles, in place. Although coarse glass fibers and glass microfibers are described as exemplary components of the glass fibers, the glass fibers may include only coarse glass fibers but not glass microfibers, or vice versa.

The binder may include a polysiloxane binder. To provide desired fire resistance for the finished product, fire resistant binders are used, such as high temperature binders or binders with low organic content, including polysiloxane. Other binders that are less fire resistant that may be used include polyacrylic, phenolic, polyethylene acrylate copolymer, polyethylene vinyl acetate and polyvinyl alcohol. In some embodiments, the binder may further include a flocculating agent, such as ferric nitride. The flocculating agent aggregates the binder and other liquid additives, or stated differently, agglomerates the micelles of binder and water repellent in the whitewater, so that they can accumulate on solid surfaces of the fibers and aerogel particles. This way, the binder and/or other liquid additives remain on the solid surfaces instead of passing or flowing through the mixture and into the whitewater recycle tank. As shown below, the flocculating agent used can also improve strength of the insulation product. One exemplary flocculating agent may include ferric nitride because it is inorganic, which helps maintain product fire resistant, and it improves product strength compared to Alum. Further, ferric nitride converts to iron oxide, which acts as an opacifier to block radiative heat transfer at temperatures above room temperature.

The water repellent additive may include a silicone emulsion to improve water resistance of the insulation product. In some embodiments, the silicon emulsion may include emulsions made with reactive silicon, such as SF75 manufactured by Dow Corning. The reaction of the silicone emulsion may be activated and/or facilitated by drying and elevated temperature curing to provide the desired water repellency for the insulation product. In some embodiments, a fluoropolymer water repellent additive may be used.

With continued reference to FIG. 2, once the aerogel particles, glass fibers, binder, and the various additives are mixed and form a substantially homogenous mixture, the mixture is then transferred into a dewatering box 204. The mixture may be dewatered by vacuum generated by a vacuum table 206 underneath the dewatering box 204. In some embodiments, the mixture may be dewatered through compression or by gravity. In some embodiments, the bottom of the dewatering box 204 may be lined with a carrier layer 208, which may be then subsequently bonded to the mixture and form an inner facer of the finished insulation product. The carrier layer 208 may be omitted in some embodiments. The carrier layer 208 may include a woven or nonwoven material, such as polyester, glass nonwoven, spunbond, scrim, or other suitable carrier materials. The carrier layer 208 is porous such that excess water may be removed in the subsequent dewatering and/or subsequent drying process.

Through the dewatering process, a substantial amount of the whitewater solution may be removed. Because the insulation product may be designed for cryogenic applications, and in the cryogenic temperature range, such as below 75° F., black opacifiers, such as carbon black, offer limited benefits in the thermal properties of insulation products, the insulation product may be made without carbon black or other black opacifiers. By eliminating carbon black or other black opacifiers, a closed loop whitewater system may be formed and the insulation product may be manufactured more efficiently. Specifically, the liquid removed from the mixture through the dewatering process may be drained into a whitewater recycle trough 210 and collected and processed in a whitewater recycler 212. The recycled whitewater may then be reused. Depending on the particular dewatering process employed, a minimum of 50 wt. % and as much as 90 wt. % of the liquid or process water may be readjusted to the desired viscosity and surfactant concentration to add back into the whitewater tank and reused.

After the dewatering process, a blanket 212 of entangled fibers with the aerogel particles embedded therein, the binder, and other additives uniformly distributed throughout the blanket 212 may be formed in the dewatering box 204. About 50 wt. % to about 66 wt. % of water may still remain in the blanket 212. Because the aerogel particles are hydrophobic, the residual whitewater and the wet binder contains the remaining water content in the blanket 212. The remaining water content may be removed during subsequent drying and/or curing process as discussed below.

Depending on the final form of the insulation product, the amount of the slurry mixture pumped into the dewatering box 204 may be controlled such that after dewatering, the blanket 212 formed may have a thickness ranging between about 1 inch to about 4 inches, and in some embodiments about 2 inches. The thickness of the blanket 212 may be reduced during subsequent molding process for forming the insulation product. The density of the blanket 212 formed after the dewatering process may range between about 7 pcf to 20 pcf, which may be increased during the subsequent molding process. For example, during the molding process, a 1.5" thick dewatered blanket having a density of about 10 pcf may be compressed to about 1" thickness. If no further water or whitewater is squeezed out of the dewatered blanket during the molding process, the density of the dewatered blanket may be increased to 15 pcf before drying and curing.

With continued reference to FIG. 2, once dewatered, the blanket 212 of entangled fibers may be transferred to a mold assembly 220. In some embodiments, before transferring to the mold assembly 220, the blanket 212 may be further cut into multiple sections 213 each of which would be molded into an insulation product piece. The blanket 212 or the cut sections 213 may also be referred to as preforms. The mold assembly 220 may include an upper mold member 222 and a lower mold member 224. The upper mold member 222 may be moved by a mold press 225 upward or downward relative to the lower mold member 224 to open and close the mold assembly 220. The upper mold member 222 may include one or more upper mold halves 226, each of which may take the form of a cylindrical half. The lower mold member 224 may include a corresponding number of lower mold halves 228, each of which may also take the form of a cylindrical half. When the mold assembly 220 is closed, each of the upper mold half 226 is configured to operate with a corresponding lower mold half 228 to further compress and mold the blanket 212 or sections 213 into the proper form of the insulation product, such as cylindrical halves as illustrated in FIG. 2.

Although molds of a cylindrical shape are described herein as an example, the molds may be formed by cooperating pieces that may define an arc greater than or less than a half circle. In some embodiments, instead of curved molding surfaces, the molding surfaces may be flat. FIG. 2 illustrates that the upper mold halves 226 and the lower mold halves 228 are configured in a downward facing manner with the upper mold halves 226 having a greater inner diameter than the outer diameter of the lower mold halves 228. In some embodiments, the upper mold halves 226 and the lower mold halves 228 may be configured in a generally upward facing manner with the lower mold halves 228 having a greater inner diameter than the outer diameter of the upper mold halves 226. The upper and lower mold haves 226, 228 may include water drainage or vapor outlets.

As discussed above, the preforms, or the blanket 212 or blanket sections 213, may be obtained by using vacuum, compression, and/or gravity to remove excess water from the slurry mixture. Accordingly, the dewatering process may effectively pack the slurry mixture into a denser damp mixture, which provides structural integrity to the preforms. The flocculating agent and/or the spunbond or other nonwoven carrier layer 208, including nonwoven glass fiber mat, may also add structural strength to the preforms. With sufficient structural integrity, the preforms may be molded into the various final forms of the insulation product without using a fully closed mold. For example, the mold assembly 220 is configured such that the side(s) or end(s) of each pair of mold halves may be left open, which may significantly reduce drying/curing time. Depending on the thickness of the insulation products, the molded blanket sections 213 and the mold assembly 220 may be dried and cured in a drying oven 230 at about 350° F. to about 500° F. for as little as about 30 minutes to 3 hours to substantially remove all the remaining water content.

Because after dewatering, the preform may still contain about 50 wt. % or more of water content, the processing in the oven 230 may begin with a drying process. When the water evaporates and the binder is exposed to temperatures above about 100° C., the binder starts to cure to bond the entangled fibers and the embedded aerogel particles together. The binder also bonds the carrier layer 208 to the inner or concave surface of the blanket sections 213. In some embodiments, a steam pressure autoclave may be used to cure the binder while water is still in the preform.

During the drying and/or curing process, the water repellent additive dries and cures at the same time the binder dries and cures. The water repellent additive provides water repellency throughout the insulation product. However, because of the drying process occurs outside to inside, some water repellents may slightly wick into the drier portion of the insulation product, which may make the surface portion more water repellent that the inner insulation core.

When cured, the molded blanket sections 213 forms a molded aerogel insulation product, which is a fiber reinforced aerogel composite or glass fiber reinforced aerogel composite in some examples. The molded aerogel insulation product is then demolded and trimmed, and insulation product sections 232 are produced. In some embodiments, the insulation product sections 232 may each be fabricated with an outer facer or a vapor barrier facer. The vapor barrier facer may be applied after the insulation product sections 232 are molded. Alternatively, the vapor barrier facer may be laid on the dewatered blanket 212 before it is compressed and molded. The vapor barrier facer may be bonded to the outer or convex surface of the insulation product sections 232 by the binder. The vapor barrier facer may include aluminum foil at a thickness of about 0.001" to about 0.005". The inner spunbond or other nonwoven facer and the outer vapor barrier facers may improve the structural integrity of the insulation pieces and/or minimize dust that may be generated during packaging 240, transportation, and/or installation.

Figure 3:
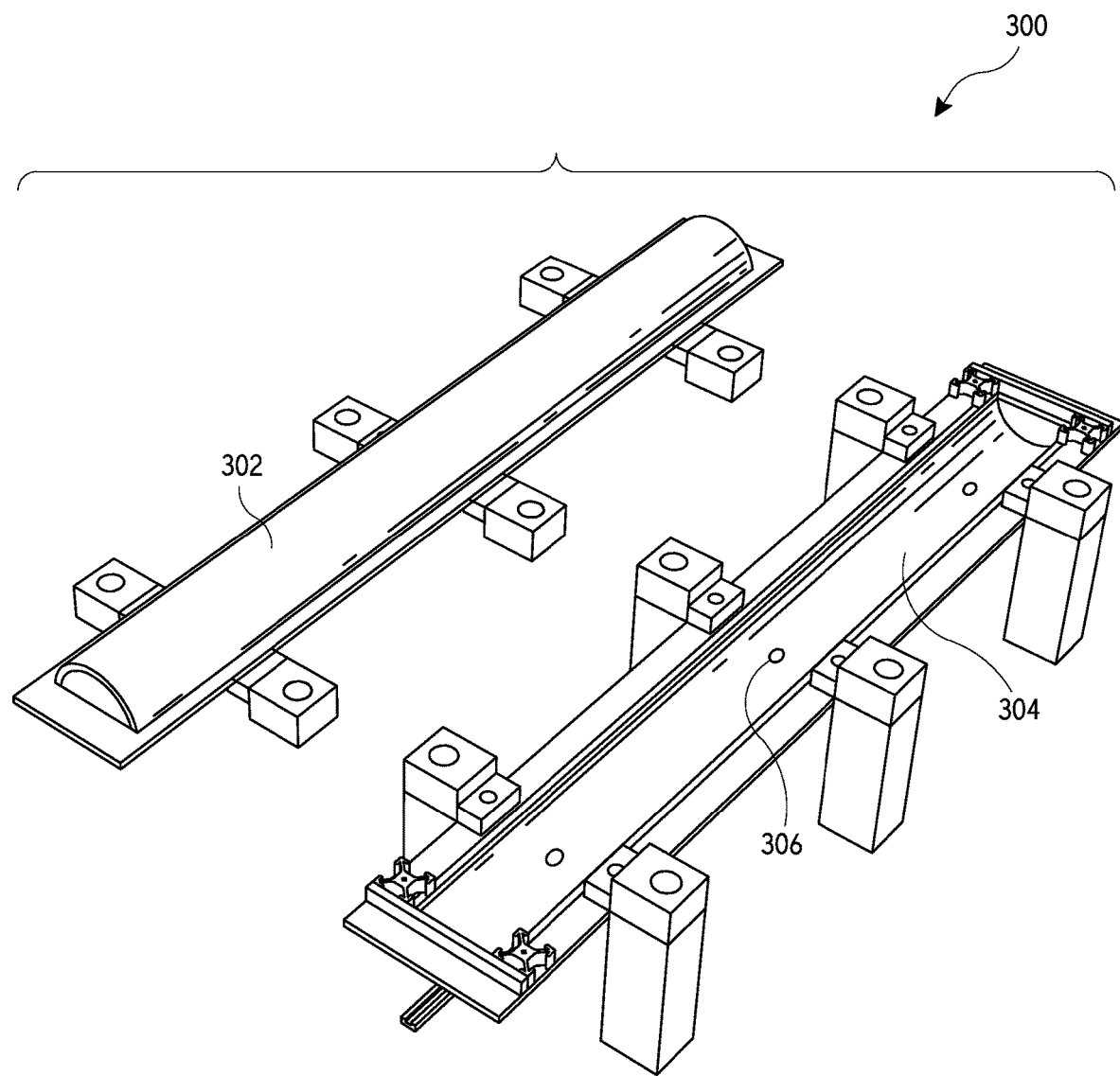
FIG. 3 schematically illustrates an exemplary mold assembly for forming an insulation product.

FIG. 3 illustrates an exemplary mold assembly 300 that may be used for forming an insulation product that may be used to form insulation layers for pipes as discussed above with reference to FIGS. 1A-1E. The mold assembly 300 may be incorporated into the system shown in FIG. 2. The mold assembly 300 may include an upper mold half 302 and a lower mold half 304. The lower mold half 304 defines a mold cavity for receiving a preform of entangled fibers with aerogel particles embedded therein and binder and other additives uniformly distributed throughout. The preform may be the blanket 212 or blanket sections 213 as discussed above with reference to FIG. 2. When the upper mold half 302 and the lower mold half 304 are closed, the preform may be compressed and take the shape of the mold 300. The compressed preform may then be cured in an oven, such as the oven 230 discussed above with reference to FIG. 2.

In some embodiments, instead of placing preforms, such as the blanket 212 or blanket sections 213 into the mold assembly 300, a damp mixture of reinforcing fibers, aerogel particles, binder, and/or additives, which may be obtained by dewatering the slurry mixture using a dewatering box, may be placed or packed into the mold assembly 300. This provides the flexibility in selecting a dewatering equipment. In some embodiments, the lower mold half 304 may be configured with drainage holes 306 at the bottom of the lower mold half 304 such that excess water in the slurry mixture may be drained before being cured. Although FIG. 3 illustrates a mold assembly 300 defining a cavity of a cylindrical half. Other mold cavity configuration may be utilized for producing curved or flat sections of the insulation product. In some embodiments, the mold may be a clamshell mold and thus produces full cylindrical or two connected cylindrical halves. Further, although only one mold assembly 300 is illustrated in FIG. 3, multiple mold assemblies 300 may be arranged in an array similar to the mold assembly 220 shown in FIG. 2 for manufacturing multiple insulation product sections simultaneously.

As discussed above, the fiber reinforced aerogel composite insulation product may be molded from preforms of entangled fibers with aerogel particles, binder, and other additives embedded therein, which offer excellent finished product strength. Alternatively, the fiber reinforced aerogel composite insulation product may be molded by packing the dewatered mixture of entangled fibers, aerogel particles, binder, and/or other additives into molds of any shapes. This may be achieved by breaking the entangled mixture into smaller pieces, if needed, and pack the smaller pieces into the molds. The fiber reinforced aerogel composite insulation product formed by the alternative packing method allows insulation products of complex shapes including elbows and tees to be made by molding while still offers sufficient product strength.

Figure 4:
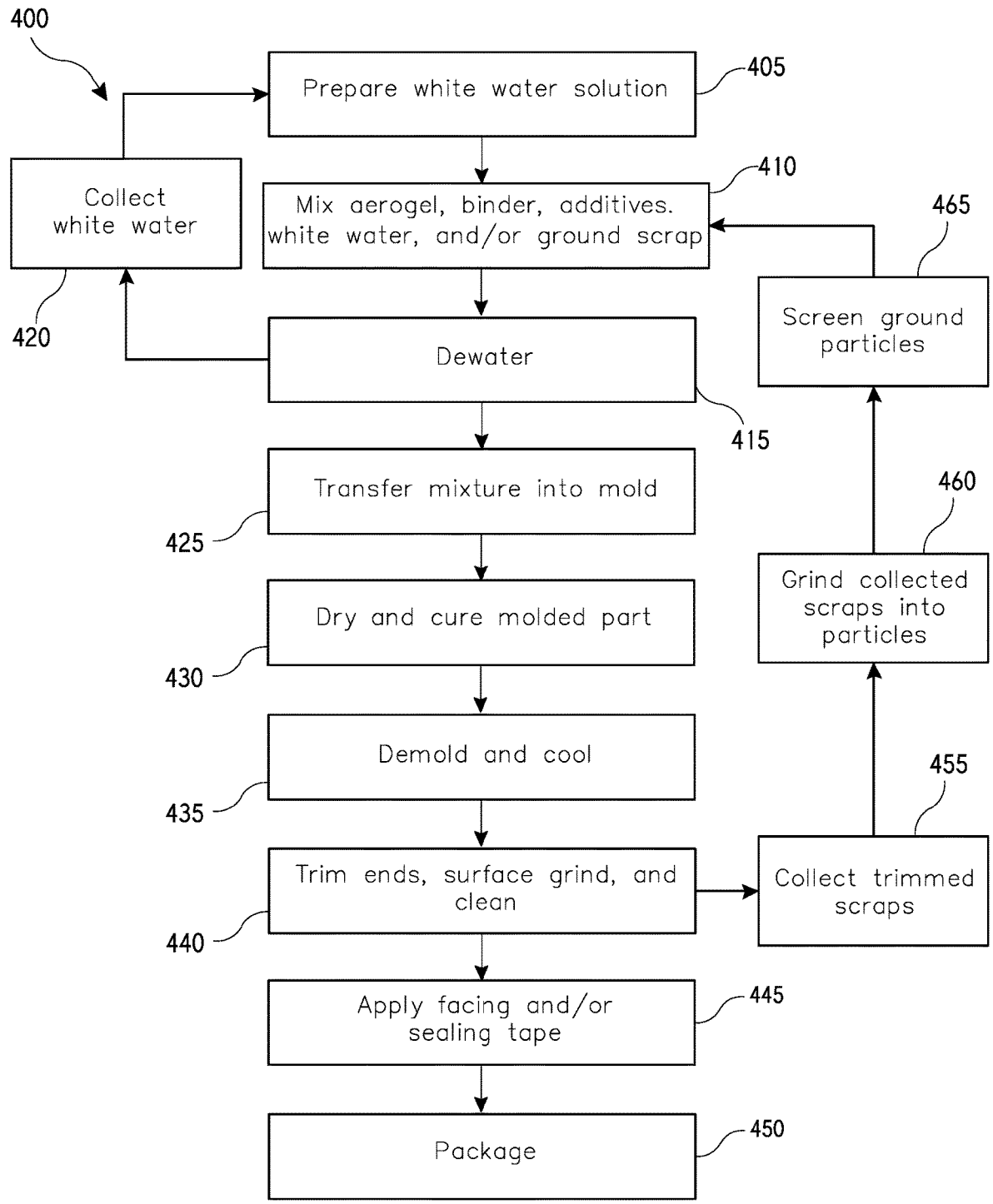
FIG. 4 illustrates an exemplary method of forming an insulation product.

Referring now to FIG. 4, illustrated is a method 400 of forming an insulation product that may be used to form insulation layers for pipes as discussed above with reference to FIGS. 1A-1E. The method may be performed using all or some components of the system 200 described above with reference to FIG. 2. At block 405, an aqueous solution is prepared. The aqueous solution may include whitewater, which may further include recycled whitewater if a closed loop whitewater system is implemented as discussed above with reference to FIG. 2. At block 410, aerogel particles, fibers, binder materials, and various additives are mixed together in the whitewater solution so that the aerogel particles, the fibers, the binder and the additives are uniformly dispersed in the whitewater solution to form a homogenous slurry or mixture. At block 415, the homogenous mixture is dewatered using gravity, compression, vacuum, and/or other dewatering techniques. The water content removed includes whitewater that may be collected and recycled at block 420. At block 425, the dewatered mixture is transferred into a mold assembly that defines the shape of the finished insulation product. In some embodiments, the mixture may be dewatered over a carrier layer, such as a spunbond nonwoven material, which may also be transferred into the mold assembly and subsequently forms an inner facer of the finished insulation product. At block 430, the dewatered mixture, while being held in the mold, is dried to remove excess water content and the binder in the mixture is cured in an oven. The drying process may take place first as the temperature of the molded mixture increase. The curing process may be performed at a temperature between about 350° F. to about 500° F. for a period of time between about 30 minutes to about 3 hours. Once dried and cured, the molded product is demolded and cooled at block 435. At block 440, end trimming, surface grind, and/or cleaning of the molded product may be performed, if necessary. In some embodiments, depending on the applications, the method 400 may further include applying an outer facer, such as a vapor barrier facer, to the outer surface of the insulation product at block 445. At block 445, a joining or sealing tape or other adhesives may also be applied along the edge of the outer facer to facilitate joining adjacent insulation product pieces together. At block 450, the finished insulation product pieces are packaged.

In some embodiments, the method 400 of FIG. 4 may include additional steps that enable recycling insulation product that is trimmed or scrapped due to blemishes or other minor defects. Specifically, at block 455, trimmed scraps may be collected, and at block 460, the collected scraps may be ground up, screened and refeed into the manufacturing process. A ratio of new ingredients to the recycled content, which is also referred to as refeed, ranges about 10:1, 15:1, 20:1, 25:1, or greater. In some embodiments, up to 5 wt. % refeed may be included in the formed insulation product that offers excellent structural and insulation properties. In some embodiments, the scraps may be shredded or lightly ground to create small pieces or particles having a diameter less than about 0.15 inches, less than about 0.13 inches, less than about 0.1 inches, or less. At block 465, the shredded/ground particles may be further screened to remove any larger chunks and/or clumps of fiber reinforced aerogel composite having a diameter greater than or about 0.1 inches. The removed clumps may include clumps of the glass fibers, also referred to as bird-nests of glass fibers, which may be formed by agglomerated glass fibers that may be difficult to break apart. The glass fibers that form the clumps or bird-nests may be as long as about 2 to 4 times the clump diameter. Once the scraps are ground and screened, the particles may then be refed and used as a dry batch material.

Figure 5A:
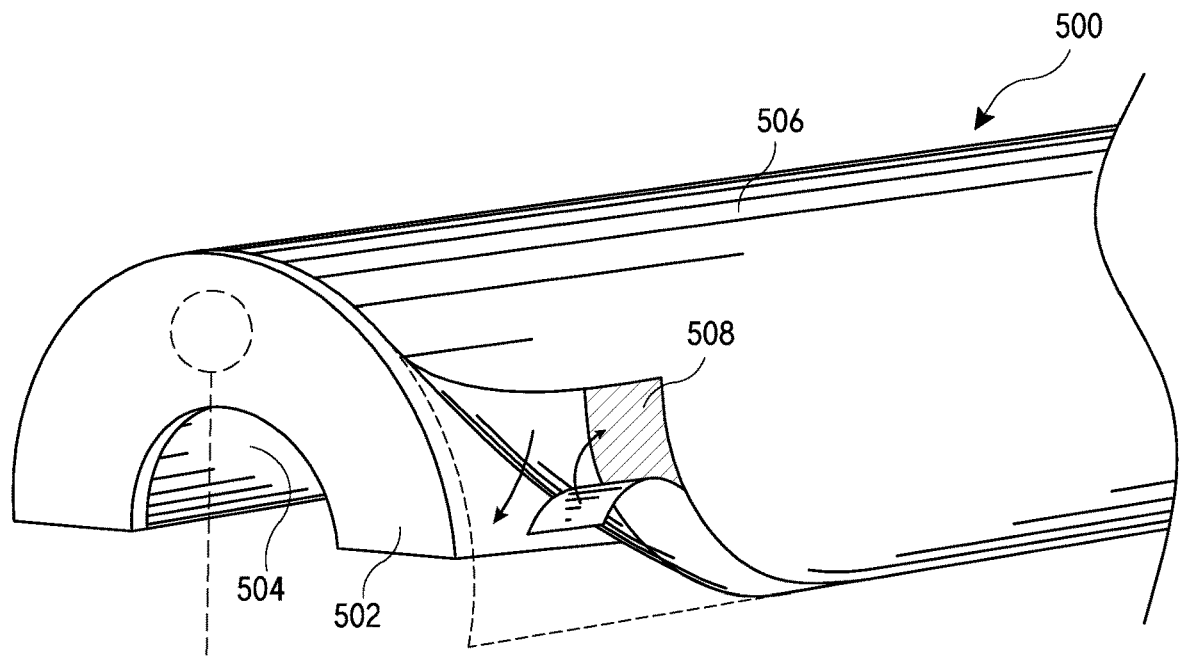
FIG. 5A schematically illustrates an exemplary insulation product including a fiber reinforced aerogel composite body that may be formed using the system of FIG. 2 and/or the method of FIG. 4.

FIG. 5A illustrates an insulation product 500 that may be made using the system 200 of FIG. 2 and/or method of FIG. 4 described above. The insulation product 500 illustrated is a cylindrical half, but may take or be molded into any suitable form. The insulation product 500 includes a fiber reinforced aerogel composite body 502, an inner facer 504 attached to an inner surface of the fiber reinforced aerogel composite body 502, and an outer facer 506 attached to an outer surface of the fiber reinforced aerogel composite body 502. The inner facer 504 generally includes a spunbond, a scrim, or other woven or nonwoven porous layer and/or material. The outer facer 506 may include a vapor retarder facer, such as ASJ-4535 facing, which is a flame-retardant vapor barrier facing manufactured by Johns Manville, or Custom Laminating 8923 vapor barrier manufactured by Custom Laminating Corporation. The inner facer 504 and/or the outer facer 506 improve the structural integrity of the insulation product 500, and reduce dust generated during transportation and/or installation. The outer vapor barrier facer 506 also limits vapor transfer between layers of the insulation products 500 when multiple nested layers of the insulation products 500 are installed to achieve desired insulation result. However, the insulation product 500 may be manufactured without the inner facer 504 and/or the outer facer 506, because the insulation product 500 may possess sufficient structural integrity to maintain its shape during storage, transportation and/or installation. A vapor barrier layer or material may be applied when the insulation products 500 are installed in the field.

In some embodiments, the outer facer 506 may extend beyond a longitudinal edge of the outer surface of the fiber reinforced aerogel composite body 502, and a sealing mechanism, such as a sealing tape 508, may be applied at the extension of the outer facer 506 on the side of the extension facing the fluid pipe or container or another nested insulation layer. The sealing tape 508 may be included if the insulation product 500 is in a pipe or cylinder form, such as a clamshell body. The tape 508 may be included along the longitudinal edge of one of the two cylindrical halves of the clamshell body. When the insulation product 500 is placed about the pipe or container to be insulated, the tape 508 may be adhered to the other surface of the other of the two cylindrical halves of the clamshell body to close the longitudinal joint/seam formed by the abutting edges of the two adjacent pieces. In some embodiments, insulation products 500 in the form of cylindrical halves or smaller pieces, flat or curved, may also include a sealing tape that may join and seal the longitudinal joints/seams of adjacent pieces. Lateral vapor transfer may occur at the interface between the sealing tape and the insulation facer where certain types of pressure sensitive adhesives or less than smooth surface substrates may allow vapor to move within that interface. To limit or substantially eliminate lateral vapor transfer, wider tapes are often used to minimize the lateral vapor transfer by making the vapor path length longer. In some embodiments, the width of the tape 508, as measured along the extension of the outer facer 506 beyond the fiber reinforced aerogel composite body 502, may be at least 1 inch, at least 1.5 inches, at least 2 inches, or more in various embodiments depending on the thickness of the insulation layer installed and other factors. For example, when multiple insulation layers are installed with each layer having a thickness of about 1.0 to 1.25 inches, the width of the sealing tape 508 may be at least 1.5 inches or more to minimize or substantially eliminate lateral vapor transfer across taped joints. To further limit vapor transfer, the circumferential joints/seams between adjacent insulation products 500 may also be sealed with tapes, such as 3M™ Venture Tape™, Cryogenic Vapor Barrier Tape 1555CW, or other sealing mechanisms.

The fiber reinforced aerogel composite body 502 may include a thickness defined as the distance between the inner and outer surfaces of the fiber reinforced aerogel composite body 502. The thickness may range between about 0.5 inches and about 2 inches, between 0.75 inches and about 1.5 inches, or between about 1 inch and about 1.25 inches in various embodiments. The insulation product 500 may also be made with a thickness greater than 2 inches or less than 0.5 inches. Depending on the applications, a single layer or multiple layers of the insulation product 500 may be utilized to achieve desired insulation performance. When the fiber reinforced aerogel composite body 502 is formed with a relatively smaller thickness, the insulation product 500 may be flexible enough to be wrapped around surfaces to be insulated, such as curved surfaces of relatively large diameters. For example, the insulation product 500 may be molded as a flat material at a thicknesses of about 10 mm or less at a density of about 6.5 pcf. The insulation product 500 may be flexible enough to be wrapped around pipes with diameters greater than about 12 inches. Consequently, to provide insulation to large containers, flat sheets or rolls of the insulation product may be produced and provided to contractors for on-site fabrication and insulation around large pipes, tanks and complex shapes to be insulated. The insulation sheets may be faced on the inner surface with a lightweight carrier nonwoven such as 18-20 gsm polyester or similar nonwoven and faced on the outer side with the Custom Laminating 8923 vapor barrier manufactured by Custom Laminating Corporation.

Figure 5B:
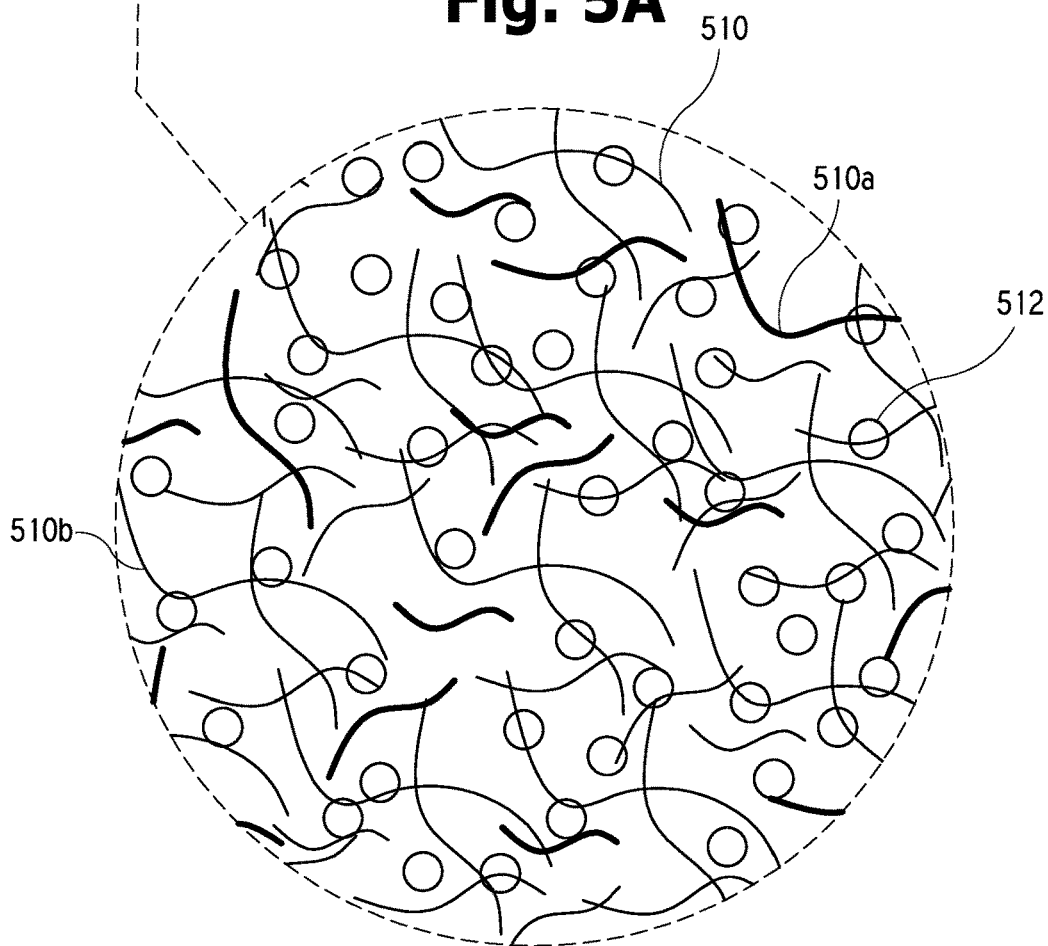
FIG. 5B schematically illustrates an enlarged view of a cross section of the fiber reinforced aerogel composite of FIG. 5A.

FIG. 5B illustrates an enlarged view of a cross section of the fiber reinforced aerogel composite body 502 of FIG. 5A in greater detail. The fiber reinforced aerogel composite body 502 includes a network of entangled fibers 510 with aerogel particles 512 embedded in the fiber network. As illustrated, the entangled fibers are randomly oriented, or in other words, the fiber orientation is in all directions. As discussed above, the entangled fibers 510 may include one or more types of fibers, such as glass fibers, polymeric fibers, and the like. Each type of the fibers included in the fiber reinforced aerogel composite body 502 may further vary in sizes, such as being made of different lengths and/or diameters. In some embodiments, the entangled fibers 510 may include a combination of entangled coarse glass fibers 510a having average fiber diameters greater than 6 microns and glass microfibers 510b having average fiber diameters of less than 6 microns. The entangled fibers define a network within which the aerogel particles 512 are uniformly dispersed throughout. Although not explicitly illustrated, the cured binder and other additives are also uniformly distributed throughout the fiber network. The binder bonds the entangled fibers 510, the aerogel particles 512, and/or the various other additives together to form the fiber reinforced aerogel composite body 502. The random or all-direction orientation of the entangled fibers 510 and the uniform dispersion of the aerogel particles 512, the binder and/or the additives throughout the fiber network is achieved by mixing the ingredients in the whitewater solution to form a homogenous mixture and by dewatering the mixture soon after the homogenous mixture is formed so as to prevent the ingredients from settling or separating and creating non uniformity in the dewatered mixture.

Depending on the applications, the molded finished fiber reinforced aerogel composite may include between about 50 wt % and about 75 wt % of the aerogel particles, between about 5 wt % and about 20 wt % of the binder, between about 1 wt. % and about 6 wt. % of the coarse glass fibers, between about 5 wt. % and about 15 wt. % of the glass microfibers, and between about 0.01 wt. % and about 5 wt. % additives, such as water repellant additives. A ratio of the weight of the aerogel particles to the combined weight of the coarse glass fibers and the glass microfibers ranges between about 2:1 and about 5:1. A ratio of the weight of the coarse glass fibers to the weight of the glass microfibers ranges about 1:3 to 2:3, such as 3:10. Exemplary compositions of the fiber reinforced aerogel composite made according to the method described herein, such as the fiber reinforced aerogel composite body 502 or the insulation product 500 without facers, are shown in Table 1 and Table 2. The fiber reinforced aerogel composites shown in Table 1 and Table 2 are composed mainly of aerogel particles and do not include any black opacifiers.

TABLE 1

Fiber Reinforced Aerogel Composite with 65 wt. % Aerogel Content.

| Components | % by weight (dry) |
| --- | --- |
| Aerogel Particle (e.g., Aerogel P400 by Cabot Corp.) | 65 |
| Microfiber (e.g., Microfiber 481 (210x) by Johns Manville) | 15 |
| Coarse fiber (e.g., Chopped Strand E-Glass by Johns Manville) | 10 |
| Binder (e.g., Polon MF-56 by Shin-Etsu Silicones of America) | 9.44 |
| Hydrophobic Agent (e.g., SF 75 by Dow Corning) | 0.66 |

TABLE 2

Fiber Reinforced Aerogel Composite with 70 wt. % Aerogel Content.

| Components | % by weight (dry) |
| --- | --- |
| Aerogel Particle (e.g., Aerogel P400 by Cabot Corp.) | 70 |
| Microfiber (e.g., Microfiber 481 (210x) by Johns Manville) | 10 |
| Coarse fiber (e.g., Chopped Strand E-Glass by Johns Manville) | 3 |
| Binder (e.g., Polon MF-56 by Shin-Etsu Silicones of America) | 15 |
| Hydrophobic Agent (e.g., SF 75 by Dow Corning) | 2 |

The higher aerogel content of the fiber reinforced aerogel composite shown in Table 2 creates a fiber-aerogel network that is more closely or tightly packed than the fiber reinforced aerogel composite shown in Table 1. This tighter packing provides an insulation product that has increased integrity and less dust. The tighter packing may be due to the fact that adding about 5% more light density aerogel (i.e., lighter than the other components in the composite) fills more void spaces in the insulation. Fewer void spaces relates to fewer areas where moisture/water can accumulate. Fewer void spaces also relates to fewer weak points in the insulation.

Depending on the composition of the fiber reinforced aerogel composite and/or the pressure applied by the mold holding the composite during the drying/curing process, the finished molded fiber reinforced aerogel composite, in curved section form or flat board form, typically has a density of between about 5.5 pcf and about 8 pcf. This density range balances product integrity/strength and cost and offers commercially viability for various insulation applications. Table 3 lists the densities of various fiber reinforced aerogel composite samples with different aerogel particle content. Finished products with higher density of up to about 12 pcf have been produced using the method described herein. Light weight products with a density as low as or below 5.5 pcf may be faced on the interior with a porous inner facer and/or on the exterior with a vapor barrier facer to deliver good insulation property as well as structural strength.

TABLE 3

Densities of Select Fiber Reinforced Aerogel Composites.

| Aerogel % by weight (dry) | Density (pcf) |
|---|---|
| 70 | 7.8 |
| 70 | 6.5 |
| 65 | 6.5 |
| 65 | 7.5 |
| 60 | 7.0 |

Compared to conventional insulation products that use aerogel, the fiber reinforced aerogel composites produced using the methods described herein can be made using less amount of aerogel particles, which is typically the most expensive component, while still offers comparable or even better insulation property and/or structural strength. Because less aerogel particles are used, the fiber reinforced aerogel composites are much stronger and have or generate less dust because the microfiber network effectively holds a majority of the aerogel particles in place. The fiber reinforced aerogel composites are also more cost effective than conventional insulation products that use aerogel.

Table 4 lists the flexural strength breaking load of various fiber reinforced aerogel composite samples. Flexural strength is generally tested per ASTM C203. The test results were obtained based on a modified ASTM C203 test so as to use 1 inch×1 inch×4 inches samples. Samples #1, #2, and #3 contains about 70% wt. % aerogel particles of the finished fiber reinforced aerogel composites, and sample #4 contains about 65 wt. % aerogel particles of the finished fiber reinforced aerogel composite. Samples #1, #3, and #4 use ferric nitride as the flocculant, and sample #2 uses Alum (a hydrated double sulfate of aluminum and potassium) as the flocculant, although other flocculants may be used. Generally, the higher the density of the fiber reinforced aerogel composite, the greater the flexural strength the fiber reinforced aerogel composite possesses. The fiber reinforced aerogel composite also possesses excellent flexural strength under cold or cryogenic temperatures. The breaking load of the fiber reinforced aerogel composite after submersion in liquid nitrogen is reduced by no more than 20%, or no more than 15% in some embodiments as compared to the breaking load measured without liquid nitrogen submersion.

TABLE 4

Flexural Strength Breaking Load of Select Fiber Reinforced Aerogel Composites.

| Sample ID | Aerogel wt. % | Density (pcf) | Max Load gF (avg) | Max Load gF (avg) After LN$_2$ submersion |
|---|---|---|---|---|
| # 1 - 70% 7 pcf Fe(NO$_3$)$_3$ | 70% | 6.90 | 2103 | 1812 |
| # 2 - 70% 7 pcf Alum | 70% | 6.60 | 1818 | 1535 |
| # 3 - 70% 7 pcf Fe(NO$_3$)$_3$ Hand Packed | 70% | 7.10 | 1776 | — |
| # 4 - 65% 7 pcf Fe(NO$_3$)$_3$ | 65% | 6.61 | 2685 | — |

As discussed above, the fiber reinforced aerogel composite may be molded from a preform formed by dewatering the homogenous mixture of fibers, aerogel particles, binder, additives, etc. on a porous carrier layer. Alternatively, the fiber reinforced aerogel composite may be molded by packing the dewatered mixture into the mold. Breaking the dewatered mixture into loose clumps may be involved in the alternative process to pack the dewatered mixture into molds of complex shapes, which may yield a molded insulation product with slightly reduced flexural strength. Generally, the reduction in flexural strength may be less than about 20%, less than about 15%, less than about 10%, less than about 5%, as compared to insulation products formed from preforms with similar composition and/or density. Samples #1, #2, and #4 listed in Table 4 were molded from preforms, and sample #3 was formed by breaking and packing the dewatered mixture into a mold.

Table 4, as well as Table 5 below, illustrates that variables, such as insulation density, aerogel content, flocculating agent type, and/or using hand packed or dewatered blanket can be selected to achieve desired insulation properties. For example, about 70% aerogel content at about 7 pcf density with ferric nitride as the flocculant may be selected for manufacturing an insulation product. Other factors, such as ease of blending, ease of dewatering, finishing and cutting the finished product may also be considered in selecting this and other desired compositions.

Table 5 lists the load strain at different compression percentages of various fiber reinforced aerogel composite samples, tested in accordance with ASTM C165.

TABLE 5

Load Strain of Select Fiber Reinforced Aerogel Composites.

| | Load Strain (lbf) | | | |
|---|---|---|---|---|
| % Compressed | Sample #1 70% 7 pcf Fe(NO$_3$)$_3$ | Sample #2 70% 7 pcf Alum | Sample #3 70% 7 pcf Fe(NO$_3$)$_3$ Hand Packed | Sample #4 65% 7 pcf Fe(NO$_3$)$_3$ |
| 5 | 201.48 | 150.74 | 604.68 | 589.95 |
| 10 | 359.48 | 296.10 | 728.18 | 724.08 |
| 15 | 480.32 | 414.33 | 872.55 | 884.83 |
| 25 | | 637.54 | 1267.82 | 1329.70 |

The fiber reinforced aerogel composites further possess excellent thermal insulation properties. The fiber reinforced aerogel composites described herein demonstrates improved thermal performance as compared to conventional pipe insulation materials, such as cellular glass or polyisocyanurate insulation rigid (PIR) foam. For example, the fiber reinforced aerogel composites that include about 60 wt. % to 70 wt. % aerogel particles and densities between 6.5 pcf to 8 pcf may have a thermal conductivity of about 10 to 12 mW/m-K at about −250° F. to about −150° F., a thermal conductivity of about 12 to 18 mW/m-K at about −150° F. to about 50° F., a thermal conductivity of about 18 to 20 mW/m-K at about 50 to 100° F., and a thermal conductivity of about 20 to 35 mW/m-K at about 100 to 400° F., tested in accordance with ASTM C518. In contrast, conventional cellular glass pipe insulation products may have a thermal conductivity that is at least twice the thermal conductivity of the fiber reinforced aerogel composites described herein. For example, conventional cellular glass pipe insulation typically have a thermal conductivity of about 22 to 25 mW/m-k at about −250° F. to −150° F., a thermal conductivity of about 25 to 40 at about −150 to 50° F., a thermal conductivity of about 40 to 45 mW/m-K at about 50 to 100° F., and a thermal conductivity of about 45 to 80 mW/m-K at about 100 to 400° F.

Another way to evaluate an insulation material's thermal performance is the k factor. Usually, insulation materials have a k factor of less than one, and the lower the k factor, the better the insulation. The fiber reinforced aerogel composites described herein typically have a k factor of about 0.07 at about −270° F., about 0.1 at about −50° F., about 0.15 at about 200° F., and about 0.25 at about 400° F. At higher temperatures, the k factor for the fiber reinforced aerogel composites described herein may increase from 0.25 at about 400° F. to about 0.5 at about 700° F. Conventional cellular glass insulation products may have a k factor of about 0.16 at about −270° F., about 0.23 at about −50° F., about 0.3 at about 200° F., and about 0.5 at about 400° F. At higher temperatures, the k factor for conventional cellular glass insulation products may increase from about 0.5 at about 400° F. to 0.75 at about 700° F.

Given its improved insulation properties as compared to conventional cellular glass or polyisocyanurate insulation rigid (PIR) foam insulation products, the fiber reinforced aerogel composites described herein can achieve equivalent thermal performance with reduced thickness. For example, to insulate a pipe having a 12-inch inner diameter for transporting liquefied natural gas at −170° C. with the environmental temperature being about 23° C., a total thickness of about 110 mm of cellular glass insulation material or a total thickness of about 100 mm polyisocyanurate insulation rigid (PIR) foam may be needed to achieve a heat flow of 36.6 or 33.1, respectively, as measured per unit length of the pipe, in btu/hr-ft. To insulate the same pipe, a total thickness of only about 50 mm of the fiber reinforced aerogel composite described herein can achieve a heat flow of 32.6 btu/hr-ft per unit length of pipe. When a reduced thickness of insulation product is used, a smaller outer diameter of the insulated pipes may be achieved, which allows for closer arrangement of multiple pipes and also reduces the size of protective cladding to cover the insulated pipe.

The thermal performance the fiber reinforced aerogel composites possess may be further improved by increasing the content of aerogel particles in the fiber reinforced aerogel composites. For example, by increasing the aerogel particle content from 60 wt. % to 70 wt. %, the thermal conductivity of the fiber reinforced aerogel composite may be decreased from about 12 mW/m-K to about 10 mW/m-K at about −238° F., decreased from about 14.5 mW/m-K to about 12.5 mW/m-K at about 150° F., decreased from about 17 mW/m-K to about 15 mW/m-K at about −50° F., decreased from about 19 mW/m-K to about 16.5 mW/m-K at about 32° F., and decreased from about 20.5 mW/m-K to about 18 mW/m-K at about 75° F. The thermal performance of the fiber reinforced aerogel composites may be further improved by increasing the densities of the molded product. For example, for molded fiber reinforced aerogel composites that contains similar aerogel particle content, increasing the density by about 10% may lead to at least about 5%, about 7%, or greater reduction in thermal conductivity.

The fiber reinforced aerogel composite described herein also improves manufacture and installation efficiency. The cellular glass and polyisocyanurate insulation rigid (PIR) foam insulation products are typically produced as blocks that are then cut and fabricated into smaller pieces. Fixing the smaller pieces onto a pipe in the field can be labor intensive because the insulation system typically involves two to three insulation layers, an outer primary vapor barrier, an intermediate vapor barrier between the insulation layers, vapor stops, and a weather protective metal layer of cladding, such as 0.016" aluminum, 0.010" stainless steel, or a nonmetallic cladding such as InsulSeal 50 manufactured by Protecto Wrap. In contrast, vapor barrier facers and sealant tapes may be applied to the exterior of the fiber reinforced aerogel composite during fabrication, which facilitates installation in the field. Additionally, cellular glass and polyisocyanurate insulation rigid (PIR) foam insulation are relatively rigid and thus require expansion joints. In contrast, the fiber reinforced aerogel composites described herein possess certain degree of flexibility and exhibit relatively low coefficient of thermal expansion (CTE), and thus may be installed for many cryogenic applications without expansion joints.

Further, an asphalt coating is typically used between layers of cellular glass insulation because cellular glass insulation is relatively brittle and abrasive, and the pipes expand and contract frequently. The asphalt layer keeps the insulation layers from wearing each other down and creating dust. Instead of using an asphalt coating, the pre-applied facer for the fiber reinforced aerogel composites serves as the low friction expansion/contraction interface between the insulation layers. In addition, the pre-applied facers for the fiber reinforced aerogel composite described herein reduces dust that may be generated during handling and installation, and thus pose less health risk to the workers at the fabrication shop and in the field. Eliminating the asphalt coating not only eliminates a fabrication step and the associated costs, but also eliminates the combustible asphalt from the insulation system.

Some conventional insulation product that contains aerogel, such aerogel containing blankets, may achieve similar insulation performance. For example, a total thickness of 50 mm of certain existing aerogel blankets may achieve a heat flow of about 34.5 btu/hr-ft per unit length of pipe. However, conventional aerogel blankets are typically manufactured in a flexible blanket form that has a thickness of about 5 mm or about 10 mm with a thickness tolerance of about ±1 mm. To achieve a total thickness of 50 mm or greater for the desired cryogenic thermal performance, the aerogel blanket needs to be wrapped around a pipe five, ten, or more times, which can create a problem for the contractor during installation. Specifically, when wrapping five layers of the aerogel blanket that is 9 mm thick (i.e., 10 mm design−1 mm tolerance) instead of 10 mm thick per design, the total insulation thickness is 45 mm. If the adjacent section is insulated with another roll of the aerogel blanket that is 11 mm thick (i.e., 10 mm design+1 mm tolerance), then the total insulation thickness would be 55 mm. This 45 mm to 55 mm total insulation thickness difference creates a problem from both a visual and performance standpoint which is unacceptable to the end customer. In contrast, the fiber reinforced aerogel composite described herein can be molded in pipe form and ready to be installed with minimal fabrication in the field. The fiber reinforced aerogel composite may be molded to a thickness of about 25 mm to about 32 mm (or about 1 to about 1.25 inches) with a thickness tolerance of ±1 mm, which leads to much less variation on the final insulation thickness around the pipe than conventional aerogel blankets. Therefore, the fiber reinforced aerogel composite described herein improves system thickness control as compared to conventional aerogel blankets. Further, dust from the fiber reinforced aerogel composite described herein is less than conventional aerogel blankets. Even if some dust may be generated during handling, the dust from the fiber reinforced aerogel composite described herein generally falls to the floor whereas dust from conventional aerogel blanket floats in the air and gets on everything and all over the insulation contractors.

The fiber reinforced aerogel composites described herein can also be more cost effective as compared to conventional aerogel blankets. Conventional aerogel blankets are typically manufactured through a carefully controlled sol-gel process to form aerogel around a polyethylene (PE) fiber network. The fiber reinforced aerogel composite described herein is molded using already formed aerogel particles. Conventional aerogel blankets typically includes about 90 wt. % to about 95 wt. % aerogel content, which is typically the most expensive component of the insulation product. The fiber reinforced aerogel composites described herein include about 60 wt. % to about 70 wt. % aerogel particles. By using already formed aerogel particles and a lower aerogel content in the final composite, the manufacturing cost associated with the fiber reinforced aerogel composite described herein can be less. Additionally, because conventional aerogel blankets include a higher content of aerogel, the density of a typical aerogel blanket is at least 40% higher than that of the fiber reinforced aerogel composite described herein. The fiber reinforced aerogel composite may also have improved fire resistance by using glass fibers.

Table 6 below lists additional properties of select fiber reinforced aerogel composite samples that have different densities, as measured according to various ASTM test methods when applicable. The fiber reinforced aerogel composite provides an FS/SD (flame spread/smoke development) rating of 25/50, 5/30, or less, as measured according to ASTM E-84 test. The insulation product further exhibits low coefficient of thermal expansion (CTE). For example, for the fiber reinforced aerogel composite that includes about 65 wt. % of the aerogel particles, the CTE of the composite within the temperature range of 25 to 300° C. is about $11.0 \times 10^{-6}$/K, and the CTE of the composite within the temperature range of −150 to 25° C. is about $12.1 \times 10^{-6}$/K. The fiber reinforced aerogel composite also possesses the properties of low soak water retention, low water vapor sorption, and low water vapor permeability. The insulation product 500 minimizes or substantially eliminates the corrosion on steel or other metal and/or alloys.

TABLE 6

Properties of Fiber Reinforced Aerogel Composite with 65 wt. % Aerogel.

| Property | ASTM Test | Sample #1 | Sample #2 |
| --- | --- | --- | --- |
| Aerogel Content (wt. %) | | 65 wt. % | 65 wt. % |
| Typical Thickness (inches) | | 0.5-1.5 | 0.5-1.5 |
| Typical Length/Width (inches) | | 36 | 36 |
| Max Use Temp. (F.) | | 900 | 900 |
| Min Use Temp. (F.) | | <−297 | <−297 |
| Density (pcf) | C167 | 7.5 | 6.4-6.7 |
| Thermal Conductivity (flat) - (C. mean)(W/m-K) Mean Temp. (° C.) | C177/ C518 | | |
| 204 | | 0.034 | 0.034 |
| 149 | | 0.027 | 0.027 |
| 93 | | 0.024 | 0.024 |
| 38 | | 0.020 | 0.020 |
| 24 | | 0.019 | 0.019 |
| 10 | | 0.018 | 0.018 |
| −18 | | 0.017 | 0.017* |
| −50 | | 0.016 | 0.016 |
| −100 | | 0.014 | 0.014 |
| −150 | | 0.011 | 0.011 |
| Flame Spread/Smoke Developed Max | E84 | 5/30 | — |
| Water Retention Max (wt. %) | C1511 | | |
| 15 minutes submersion | | 13 wt. % | — |
| 24 hour submersion | | 32 wt. % | — |
| Corrosion | C871 | Pass | Pass |
| | C692 | Pass | Pass |
| | C1617 | Pass | Pass |
| Water Vapor Sorption | C240, C1104 | 3 wt. % | 3 wt. % |

TABLE 6-continued

Properties of Fiber Reinforced Aerogel Composite with 65 wt. % Aerogel.

| Property | ASTM Test | Sample #1 | Sample #2 |
| --- | --- | --- | --- |
| Water Vapor Permeability | E96 | >10 | >10 |
| Coeff. of Thermal Expansion 25 to 300° C. | E288 | $11.0 \times 10^{-6}$/K | — |
| Coeff. of Thermal Expansion −150 to 25° C. | E288 | $12.1 \times 10^{-6}$/K | — |

*Estimated value.

Because the fiber reinforced aerogel composite can be made without black opacifiers and thus has higher aerogel content, the fiber reinforced aerogel composite has excellent thermal performance for cryogenic, cold, or warm temperature applications from about −300° F. to about 400° F. For optimized performance at a minimal thickness at use temperatures above or about 75° F., the fiber reinforced aerogel composites may include additives that block or reduce infrared radiation, such as TiO2, carbon black, iron oxide, high boron content glass fibers, or similar materials, including use of ferric nitride which may be used as a flocculant in some embodiments and convert to iron oxide which acts as an opacifier to block radiative heat transfer at temperatures above room temperature. The fiber reinforced aerogel composites described herein retains the majority of its strength and integrity after 100 hours of 1000° F. exposure. With added infrared radiation blocking materials, the fiber reinforced aerogel composites described herein can be used for insulation at elevated temperatures of up to about 900° F.

Figure 6:
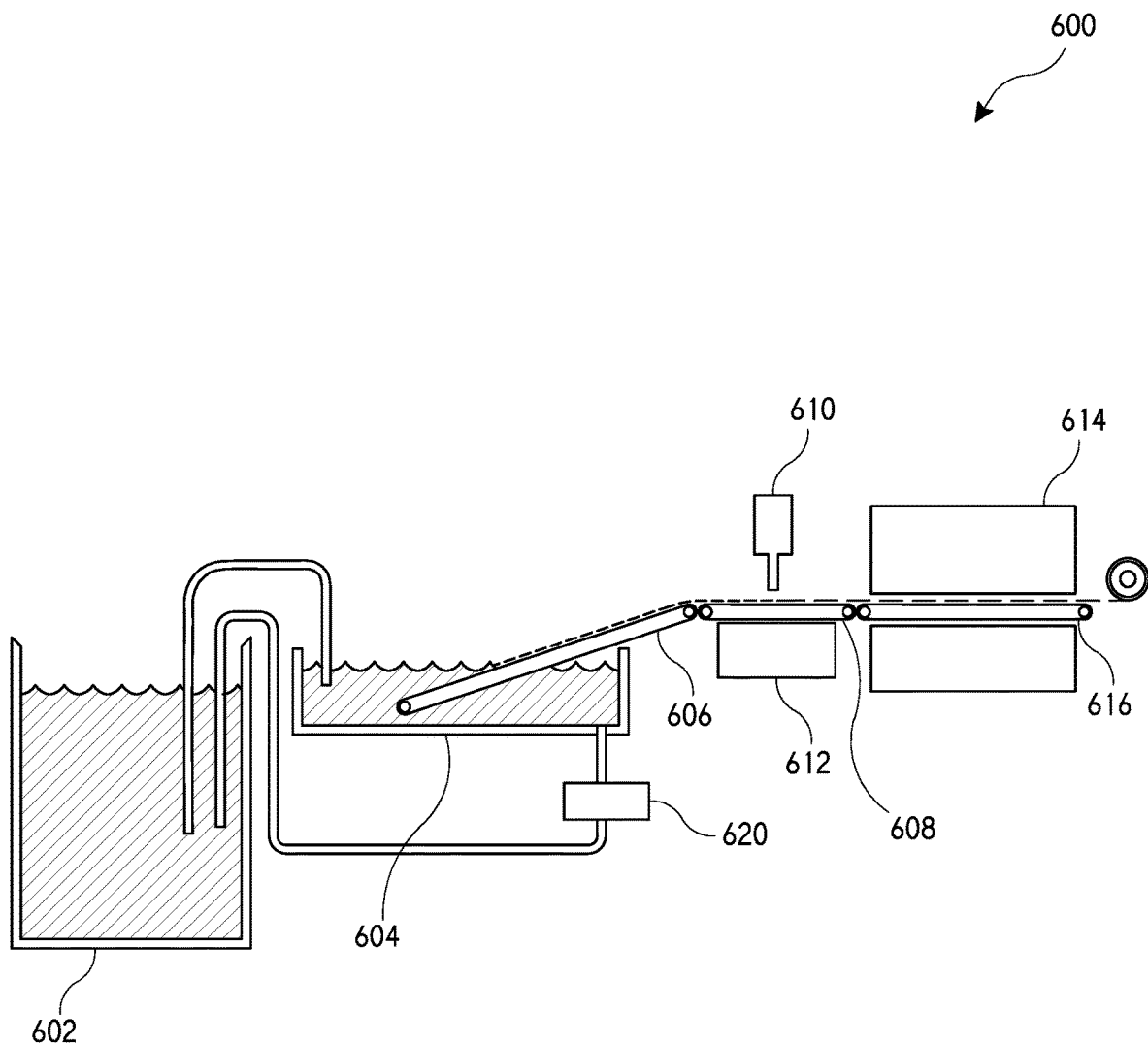
FIG. 6 schematically illustrates an exemplary system for forming fiber reinforced nonwoven aerogel mats.

FIG. 6 schematically illustrates a system 600 for forming a fiber reinforced nonwoven aerogel mat. The system 600 implements a wet laid nonwoven process. The system 600 includes a mixing chamber 602 within which whitewater solution, aerogel particles, and fibers may be mixed together using various mixing techniques, such as vortex mixing, to form a uniform slurry mixture or suspension of entangled fiber network and aerogel particles dispersed throughout. Vortex mixing can blend the ingredients together without being mechanically abusive to the ingredients, such as breaking the fibers into shorter lengths or grinding the aerogel into finer particles. In some embodiments, a flocculating agent may be added to the mixture in the mixing chamber 602. In some embodiments, no flocculating agent may be included in the fiber reinforced nonwoven aerogel mat. The uniform mixture is then processed into a trough collection system 604 and then processed onto a porous surface, such as a forming wire, on an incline conveyor 606 to remove water from the slurry mixture. Even without a flocculating agent or binder (the binder is added in a subsequent processing step), the entangled fiber in the mixture provides a network that can hold the aerogel particles and allow a wet laid mat to be formed on the forming wire. Similar to the system 200 described above with reference to FIG. 2, the system 600 may include a whitewater recycler or whitewater collector 620 that is fluidly coupled with the trough collection system 604 and the mixing chamber 602. Because the nonwoven mat may not include black material opacifiers, such as carbon black, for cryogenic, cold, or warm temperature applications, the whitewater removed from the mixture can be recycled.

Because the mixture is processed immediately or soon after the ingredients are mixed in the mixing chamber 602 so that the mixture do not settle or separate and create non-uniformity in the trough collection system 604, the mixture collected on the incline conveyor 606 may still contain at least 10% water content. The wet laid mixture is then transferred to a binder application conveyor 608. A binder applicator 610, such as a curtain coater, may be positioned above the binder application conveyor 608 for applying a binder to the wet laid mixture. A vacuum table 612 may be positioned below the binder application conveyor 608 to suction the binder into the wet laid mat and remove excess binder liquid. The mixture is then sent to a drying/curing oven 614 via an oven conveyor 616 to produce a fiber reinforced nonwoven aerogel mat. Conveying the wet laid mixture from the incline conveyor 606 to the binder application conveyor 608 and subsequently the oven conveyor 616 may be done carefully to prevent wet laid mixtures with high aerogel content from separating and pulling apart. The dried/cured nonwoven mat is then wound up or sheeted and stacked for secondary processing.

The system 600 illustrated in FIG. 6 includes an open trough head box. In some embodiments, the system 600 may be equipped with a closed head box, such as a low to medium pressure chamber into which the whitewater mixture is pumped and allowed to exit from a slot onto a forming wire. The exit includes a control slide, which may be a rectangular opening of adjustable height. With a low pressure closed headbox, surfactants can be added to the whitewater to create a froth or foam. Suspending the aerogel particles and fibers in this foam creates substantially uniform mixtures that can be evenly extruded onto or vacuumed onto the forming wire.

Although a wet laid process is described above, air laid or dry laid process may also be used in forming the fiber reinforced nonwoven aerogel mats. However, a wet laid process is generally faster than a typical dry laid process. The wet laid process described herein may take only 10% of the time a typical dry laid process requires.

Figure 7:
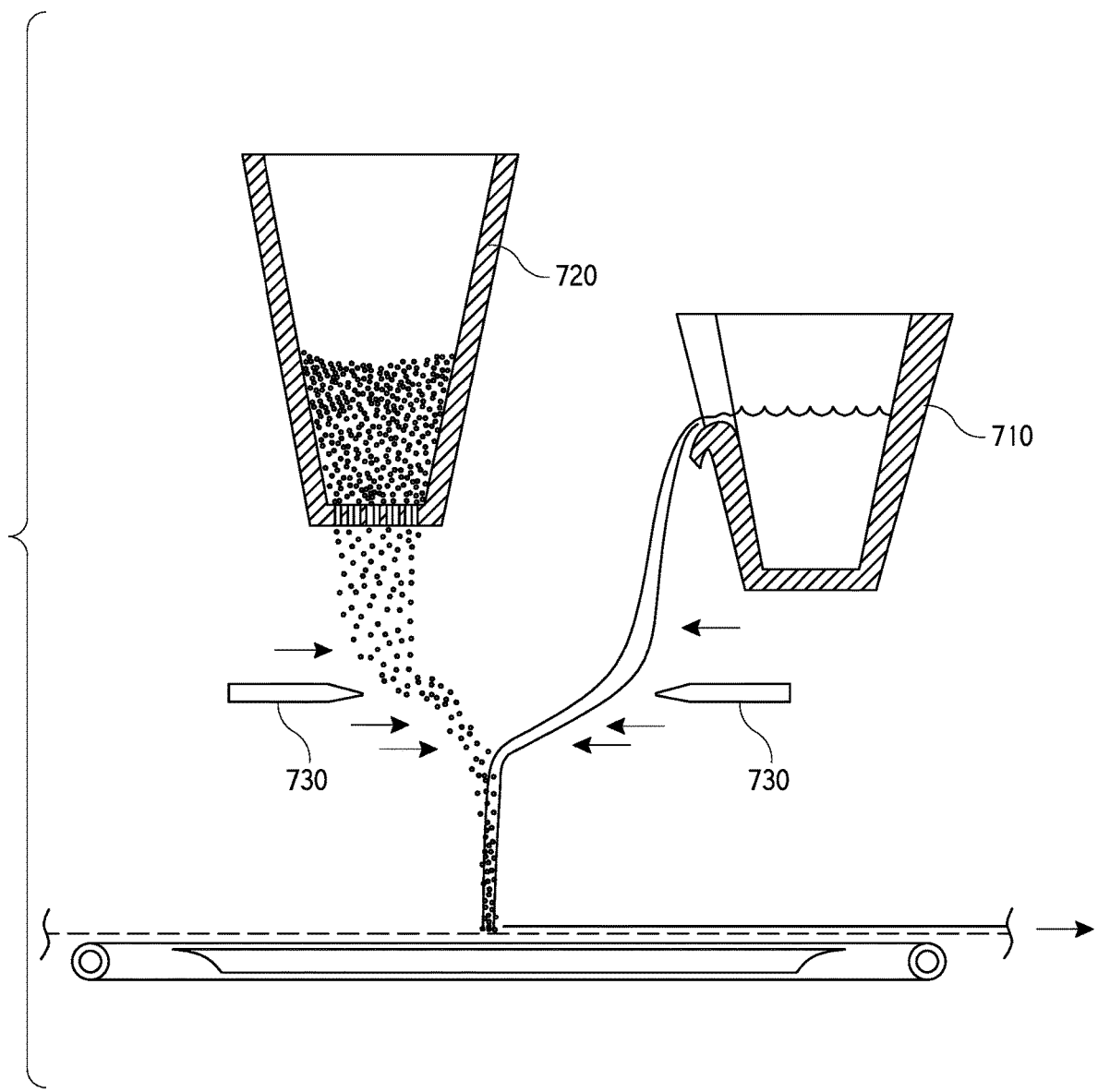
FIG. 7 schematically illustrates an exemplary component that may be used with the system of FIG. 6 for forming fiber reinforced nonwoven aerogel mats.

With reference to FIG. 7, nonwoven mats with a non-uniform concentration of aerogel particles across a thickness dimension of the nonwoven mat may be produced. In some embodiments, an aerogel rich upper surface can be produced by sprinkling additional aerogel particles on the mat. In some embodiments, the aerogel particles may be added at the same time the binder is being applied onto the mat by a binder applicator 710. In some embodiments, the aerogel particles may be applied before or after the binder application. A dry particle feeder 720 may be used to sprinkle additional aerogel particles on the mat. Depending on the application sequence, the aerogel particles feeder 720 may be positioned upstream or downstream of the binder applicator 710. When the aerogel particles and the binder are applied concurrently, opposing air curtains 730 may be used to blend or mix the additional aerogel particles and the binder. The blended aerogel particles and binder are then curtain coated on the top of the nonwoven mat and vacuum is used to suction the binder into the mat and remove excess binder liquid. Other mixing or blending methods may be used so that the aerogel may not need to be suspended in the binder and applied via the curtain coater.

The aerogel particles used for forming the nonwoven mat may include hydrophobic silica aerogel, but other particulate aerogels can be used. The aerogel particles may have a diameter ranging from 0.01 to 1.2 mm, such as Cabot P200 aerogel particles manufactured by Cabot Corporation, for forming to form up to about 60% by weight aerogel content nonwoven mats with good uniformity. In some embodiments, the aerogel particles used may have a diameter ranging from 1.2 to 4.0 mm, such as Cabot P300 aerogel particles manufactured by Cabot Corporation, for forming high aerogel content up to 80% by weight nonwoven mat. In some embodiments, mixtures of aerogel particles having a diameter from 0.01 to 1.2 mm and aerogel particles having a typical diameter from 1.2 to 4.0 mm may be used to create desired finished nonwoven mat properties. Aerogel particles that have larger diameters and minimal fines does not tend to blind off the collection screen. Finer aerogel particles that have relatively smaller diameters may increase the dewatering time for mats at basis weights of 100 gsm or more.

The fibers used for the nonwoven mats may include bicomponent fibers, glass fibers, and/or a mixture thereof. The bicomponent fibers are bonding fibers which may include bicomponent polyethylene sheath with polyester core (PE/PET) fibers, such as uncrimped Trevira 255 or 276 fibers, including TREVIRA® 276 1.7 dtex bright red 6 mm. Trevira 276 fibers may be used for forming the nonwoven mat because the core or about 50% by weight of the fiber is composed of Trevira CS polyester which has excellent fire resistance compared to regular polyester. Depending on the end use applications, flame spread of 25 or less fire resistance as measured by ASTM E84 can be beneficial. Other bicomponent fibers that provides good fire resistance may also be used. The PE sheath of the bicomponent fibers may be activated to bond the fibers and the aerogel particles together. Specifically, the temperature of the drying/curing oven 614 may be selected to activate the sheath of the bonding fiber, creating aggressive tacky adhesive that as it cools holds the fibers and the particulate matrix together. The temperature of the drying/curing oven 614 may not be set too high so as to prevent the fibers from being exposed to excessive heat to minimize shrinkage. The finished nonwoven mats may be used for applications that are below the activation temperature of the PE sheath, such as below or about 120° C. or about 248° F.

Higher application temperature may be achieved by using different fibers, such as inorganic fibers. In some embodiments, the inorganic fibers may be added to the bicomponent fibers. Depending on the applications, about 0 to 15% or 0 to 20% by weight of one or more another types of fibers can be added to provide desired properties. In some embodiments, organic bicomponent fibers may be replaced entirely by the inorganic fibers. The inorganic fibers may include glass fibers, such as coarse glass fibers, glass microfibers, or a mixture thereof. The glass fibers may constitute about 1% to 20% by weight of the cured nonwoven mat. In some embodiments, the fibers used for forming the nonwoven mats may include coarse glass fibers only. The coarse glass fibers may constitute about 5%, about 10%, about 15%, or about 20% by weight of the cured nonwoven mat in various embodiments. The coarse glass fibers typically have an average fiber diameter between about 6 µm and about 13 µm. An exemplary glass fiber that can be used for producing the nonwoven mat is available from Johns Manville as identified as STRANGF.WM 8 µm/8 mm, which is easier to transfer, to weigh the quantity, and less expensive than glass microfibers. In some embodiments, the fibers used for forming the nonwoven mats may further include glass microfibers having an average fiber diameter between about 0.5 µm and about 3 µm homogenously dispersed within the coarse glass fibers. The coarse glass fibers and the glass microfibers may each constitute about 1 to about 10% weight of the cured nonwoven mat.

In various embodiments, the binder for bonding the entangled fiber network and the aerogel particles embedded therein can be the sheath material of the bicomponent fibers, another binder material added to the mixture of fibers and aerogel particles, or a combination of the bicomponent fibers and a separate binder material. As the binder cures, the binder forms a binding framework that bonds the entangled fibers and the aerogel particles together. When bicomponent fibers are used, addition of another liquid binder may be optional. In some embodiments, a binder of about 0.1% to about 15% by weight of the cured nonwoven mat may still be added to the nonwoven mat that uses bicomponent fibers because each of the combined binding components can provide unique processing benefits and/or finished product properties. For example, the liquid binders, once dried and cured, may provide more efficient binding ability by weight or high coverage by weight than bicomponent fibers given that bicomponent fibers may have large diameters. A bonded network of bicomponent fibers may provide better tensile strength compared to liquid binders alone. Bicomponent fibers can be reactivated with heat when the nonwoven mat is mandrel wound up resulting in layer to layer bonding as will be described in more detail below. In some embodiments, when the bicomponent fibers are replaced by inorganic fibers, such as glass fibers, a liquid binder, such as polyvinyl alcohol (PVOH), of about 1% to about 10% by weight of the nonwoven mat may be used.

Additions of binder materials and/or fibers may decrease the overall aerogel content in the finished nonwoven mat, which may reduce thermal insulation performance, and in some cases, proportionally. However, additions of fire resistant binder or glass fibers or other performance enhancing components may be beneficial. In some embodiments, liquid binders such as acrylic, melamine, or reactive silicone are suitable binders for higher temperature applications up to the use temperature limit of the binder. In some embodiments, reactive silicone or fluoropolymer can be added to the binder to provide improved water resistance of the finished nonwoven mat. The water resistive treatment can be done in-line as a secondary step by curtain coating, roller coating, or spray application. The water repellant treatment can also be done in an off-line application, drying and curing process.

Table 7 below provides exemplary compositions of the nonwoven mats.

TABLE 7

Exemplary compositions of fiber reinforced nonwoven aerogel mats.

| Example | Composition |
| --- | --- |
| 1 | 150 g PE/PET bicomponent 255 fiber and 220 g aerogel particles in whitewater, curtain coated with 18% (by weight of cured mat) melamine binder to produce 2 mm thick mat at 120 gsm |
| 2 | 150 g PE/PET bicomponent 255 fiber and 220 g aerogel particles in whitewater, no liquid binder, nonwoven blend heated to 135° C. to activate the bonding fiber and consolidate the aerogel particles to produce 2 mm thick mat at 120 gsm |
| 3 | 63 g PE/PET bicomponent 276 fiber, 31 g of 8μ glass fiber and 220 g of P300 aerogel particles in whitewater, no liquid binder, nonwoven blend heated to 130° C. to activate the bonding fiber and consolidate the aerogel particles to produce 2 mm thick mat at 120 gsm |
| 4 | 63 g PE/PET bicomponent 276 fiber, 31 g of 8μ glass fiber and 220 g of P300 aerogel particles in whitewater, no liquid binder, nonwoven blend heated to 130° C. to activate the bonding fiber and consolidate the aerogel particles to produce 6 mm thick mat at 400 gsm |
| 5 | 63 g PE/PET bicomponent 276 fiber, 15 g of 8μ glass fiber, 15 g of 0.8μ glass fiber and 220 g of P300 aerogel particles in whitewater, no liquid binder, nonwoven blend heated to 130° C. to activate the bonding fiber and consolidate the aerogel particles to produce 6 mm thick mat at 400 gsm |
| 6 | 55 g PE/PET bicomponent 276 fiber and 220 g of P300 aerogel particles in whitewater, no liquid binder, nonwoven blend heated to 130° C. to activate the bonding fiber and consolidate the aerogel particles to produce 7 mm thick mat at 400 gsm |
| 7 | 165 g WM 8/8 glass fibers with 330 g P200 aerogel particles in whitewater and then curtain coated with up to 18% (by weight of cured mat) melamine binder to produce 2 mm thick mat at 120 gsm |
| 8 | 88 g WM 8/8 glass fibers with 330 g P300 aerogel particles in whitewater and then curtain coated with 20.9 g or 5% (by weight of cured mat) PVOH binder to produce 4.5 mm thick mat at 300 gsm |

Depending on the equipment capabilities and limitations, nonwoven mats of different area weight, thicknesses, and/or densities may be achieved. Although the exemplary mats listed have area weight of 120 gsm, 300 gsm, or 400 gsm, the area weight of the nonwoven mats in various embodiments may range between about 100 gsm and about 500 gsm, between about 150 gsm and about 400 gsm, or between 200 gsm and about 300 gsm. The thickness of the nonwoven mats produced may range between about 1 mm and about 10 mm, such as greater than or about 1 mm, greater than or 2 mm, greater than or about 3 mm, greater than or about 4 mm, greater than or about 5 mm, greater than or about 6 mm, greater than or about 7 mm, greater than or about 8 mm, greater than or about 9 mm, or greater. In some embodiments, nonwoven mats with a thickness less than 1 mm or greater than 10 mm may also be produced. The density of the nonwoven mats produced may range between about 4 pcf and about 5 pcf. Nonwoven mats with a density below 4 pcf or above 5 pcf can also be produced.

The nonwoven mat may include between about 50% and about 80% or between about 60% and about 75% by weight aerogel content, and may include about 55%, about 60%, about 65%, about 70%, about 75%, or greater by weight aerogel content. The nonwoven mat may include about 0% to about 30%, about 5% to about 25%, or about 10% to about 20% by weight bicomponent fiber content. The nonwoven mat may include about 0% to about 30%, about 5% to about 25%, or about 10% to about 20% by weight inorganic fiber, such glass fiber content. The nonwoven mat may include about 0% to about 15%, about 2% to about 12%, or about 5% to about 8% by weight binder content. For example, the nonwoven mat with the exemplary composition #8 listed in Table 7 above includes about 75% aerogel particles, about 20% 8 micron×8 mm glass fibers, and about 5% PVOH binder. The nonwoven mat may further include appropriate amount of other performance enhancing additives, such as fire resisting, water repelling, and/or other additives.

The nonwoven mat delivers the desired thermal and acoustic properties. It is the inventor's belief that an aerogel to fiber ratio of 60:40 by weight deliver significant benefit. Raising the aerogel to fiber ratio to 70:30 yields even better thermal performance. Although certain existing equipment may process a maximum aerogel to fiber ratio of 80:20, higher or lower ratios may be pursued using different equipment. Examples 4 and 5 listed in Table 7 have an aerogel to fiber ratio of 70:30, and have thermal and acoustic properties similar to existing aerogel blankets and have acceptable fire resistant properties. Examples 4 and 5 are expected to provide flame spread of 25 or less fire resistance. In addition, with the binder, such as the bicomponent fiber and/or liquid binder, holding the aerogel particles together, the finished nonwoven mat has good integrity and creates minimal dust during handling. Further, the processing of the bicomponent fibers is eco-friendly.

The nonwoven mat described herein can be further secondarily processed into a wide variety of shapes and boards using molding, mandrel winding, or other suitable processing methods without destroying or decreasing any desired insulation and structural properties. Depending on the applications, the secondarily processed insulation product may be in a pipe form used for pipe insulation as discussed above with reference to FIG. 1. Other shapes and/or flat boards can also be produced through the secondary processing, which can be particularly useful for applications where excellent thermal performance is desired but space is constrained. The various secondary processing methods are not limited to processing the nonwoven mats described herein, but may also be used to secondarily process other thin layer aerogel insulation products.

In some embodiments, one or more layers of the nonwoven mat can be thermoformed into various shapes while the multiple layers of the nonwoven mat are bonded to each other as they take the shape of the mold. Due to its thin profile and low thermal conductivity, a single, double, or more layers of the nonwoven mat may be molded into complex molded shapes, which can be useful in managing heat transfer for a wide variety of electronics and other consumer goods. When multiple layers of the nonwoven mats are used, the mats may be the same as or different from one another.

Figure 8:
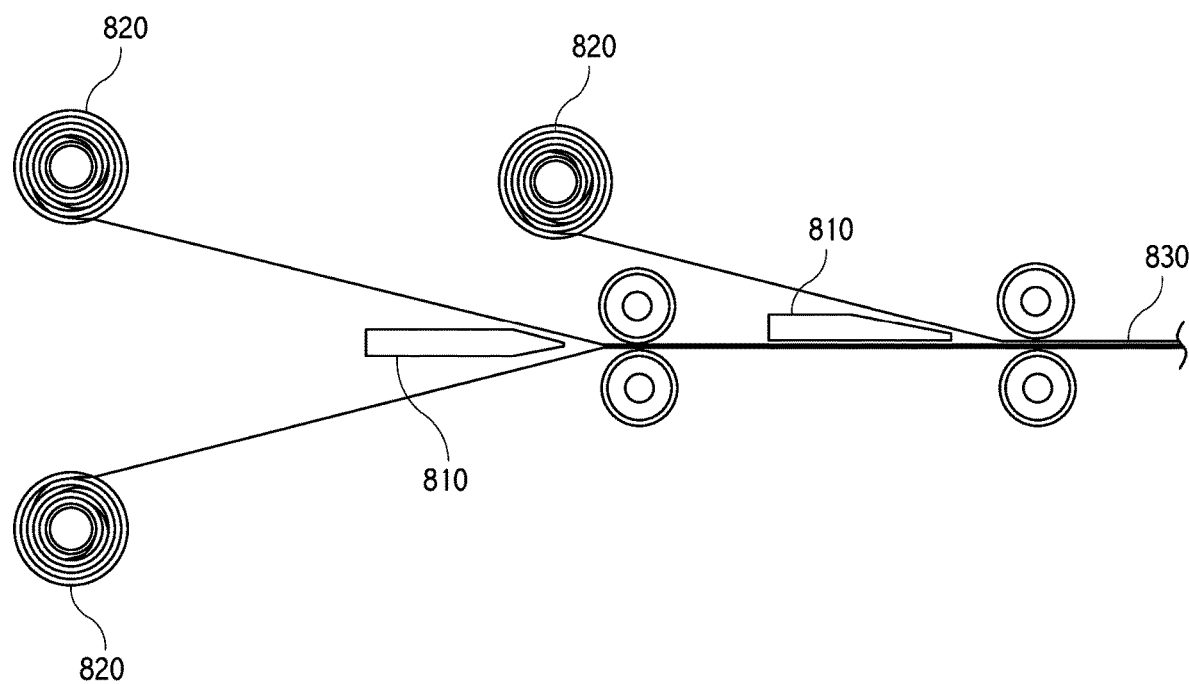
FIG. 8 schematically illustrates an exemplary system for secondarily processing fiber reinforced nonwoven aerogel mats.

With reference to FIG. 8, in some embodiments, multiple rolls of the nonwoven mats 810 can be unrolled and combined together using an adhesive or using hot air or flame spray laminating process. Hot air knives 810 may be used to reactivate the sheath of the bicomponent fibers which bonds the multiple layers of the nonwoven mats 820 together to form a laminated insulation product 830. Although three rolls of the nonwoven mats 820 are shown in FIG. 8, less or more than three rolls of the nonwoven mats 820 may be bonded together to form the laminated product 830. The rolls of the mats 820 may be the same or different from each other. Roller press may be employed to hold the mats together as the reactivated bonding sheath bonds the mats together.

In some embodiments, instead of forming a flat board of insulation product, the nonwoven mat can be wound up on a mandrel, and heat laminating may be used to laminate the layers as the mat is wound up. This would form a tubular insulation product, similar to the clamshell body discussed above with reference to FIG. 1 above. The laminated insulation product may be faced or unfaced.

In some embodiments, the binder used for forming the nonwoven mat may be reactivated. For example, a polyvinyl alcohol (PVOH) binder may be used for forming the nonwoven mat. The PVOH binder may be subsequently reactivated by wetting the mat and heated to cure to bond multiple layers of the nonwoven mats together.

Figure 9:
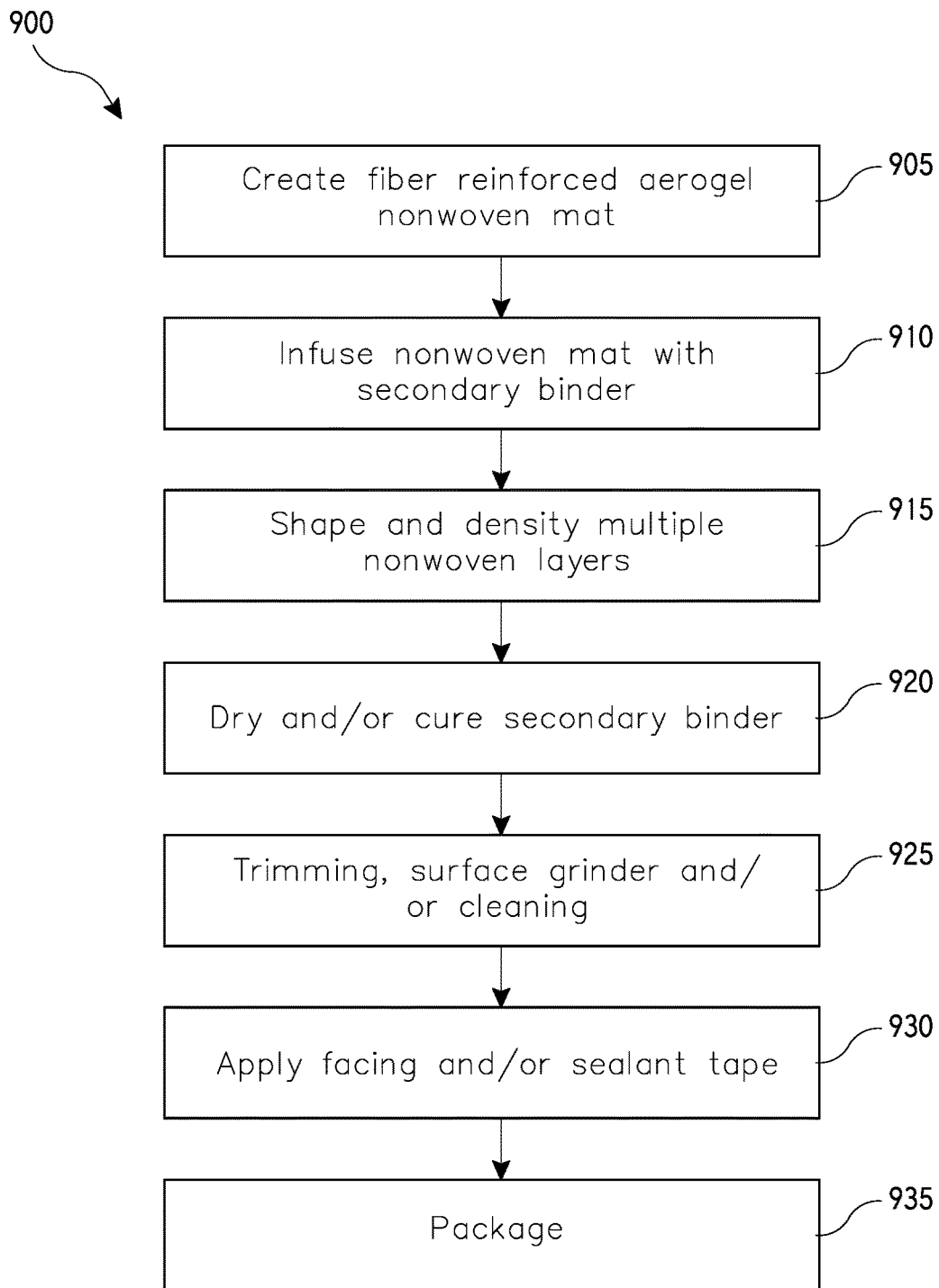
FIG. 9 illustrates an exemplary method of secondarily processing fiber reinforced nonwoven aerogel mats.

In some embodiments, the nonwoven mat may be re-saturated with a secondary binder and stacked or layered up to form a desired insulation shape by molding, mandrel winding, or other suitable shaping techniques. FIG. 9 illustrates a method 900 of secondarily processing the fiber reinforced nonwoven aerogel mat into a finished product. The method 900 may begin by forming fiber reinforced nonwoven aerogel mats at block 905. At block 910, the nonwoven mats may be re-saturated with a secondary binder. Some exemplary secondary binders may include about 5 to about 10% by dry weight sodium silicate or the polysiloxane binder for molding the fiber reinforced aerogel composite discussed above with reference to FIGS. 2-5. The mats may be re-saturated with the secondary binder by curtain coating, dipping the mats in the secondary binder, and other suitable techniques, depending on the thickness, density and porosity of the mat.

At block 915, multiple layers of the nonwoven mats re-saturated with the secondary binder may be stacked together. The stacked layers may be placed into a mold that molds the stacked layers into any suitable shapes. The mold also compress the stacked layers and thus increase the density of the multilayer product formed. In some embodiments, instead of molding, the stacked layers may be wound around a mandrel to form a cylindrical insulation product, which can be more economical process than molding. In some embodiments, a single layer of re-saturated nonwoven mat may be wound around a mandrel multiple times to form the cylindrical insulation product. The mandrel pipe in some embodiments may include holes for blowing hot air to facilitate the subsequent drying/curing process.

At block 920, the secondary binder may be cured in an oven to bond the multiple layers of the nonwoven mats together. The drying and/or curing process may be performed at a temperature between about 350° F. to about 400° F. for a period of time between about 30 minutes to about 3 hours, depending the secondary binder and/or the number of layers stacked. At block 925, the cured insulation product may then be trimmed to a desired size. Surface grinding and/or cleaning of may also be performed at block 925, if necessary. In some embodiments, depending on the applications, the method 900 may further include applying a facer, such as a flame-retardant vapor barrier facer or similar jacketing, to the outer surface of the multilayer insulation product at block 930. A joining or sealing tape or other adhesives may also be applied along the edge of the outer facer at block 930. At block 935, the finished insulation product is packaged.

Depending on the desired thickness of the finished insulation product, the finished insulation product may include 2, 3, 4, 5, 6, 7, 8, 9, 10, or more layers of the nonwoven mats. The thickness of the finished insulation product may range between about 20 mm and about 100 mm depending on the particular applications. The drying and/or curing time increases as the number of the nonwoven mat layers increases. Because the nonwoven mats, as well as the finished insulation product, possess excellent insulation property, the number of layers of the mats stacked may be determined by taking into account the drying/curing time involved to maintain manufacturing efficiency. The finished products with a thickness of ranging between about 5 mm and about 50 mm, formed from 2 to 25 layers of the nonwoven mats having individual thickness of about 2 mm, possess excellent structural and insulation properties. For example, a multi-layer finished product with a thickness of about 25 mm may be formed from about 9 layers of about 300 gsm aerogel containing nonwoven mat where the individual mat layers are re-saturated with a secondary binder, layered up and cured into an insulation of about 25 mm thickness under compression.

The secondary binder is selected such that it provides good bonding, helps control and minimize dust, is fire retardant or inorganic so that the binder does not contribute to combustibility, is moisture and water resistance, does not contain or generate toxic or hazardous components during manufacturing or using the finished insulation product, and does not deteriorate or degrade with time or with exposure to approved use temperatures. A secondary binder that provides excellent bonding, fire resistance, water repellency, and is suitable for use at exposure temperatures as low as −423° F. and up to 900° F. may be obtained by mixing a polysiloxane binder, such as Polon MF-56 manufactured by Shin-Etsu Silicones of America, and a reactive silicone water repellent, such as SF 75 manufactured by Dow Corning, together in a dilute aqueous solution to generate a uniform mixture of blend. Depending on the application, the dry weight ratio of polysiloxane binder to the reactive silicone water repellent for forming the secondary binder may be at least about 5:1, at least about 10:1, at least about 15:1, at least about 20:1, or greater. In some embodiments, about 9.44 parts by dry weight of polysiloxane binder and about 0.66 parts by dry weight of reactive silicone water repellent may be mixed in the dilute aqueous solution. The diluted mixture is then infused into the nonwoven mat by dip saturation and nip compression to dewater, by curtain coating and vacuum dewatering, or other suitable process. The dilution and/or saturation process is selected so that the finished cured product has at least about 4% and no more than about 20% by dry weight secondary binder content.

As discussed above, the nonwoven mat includes a first binder, e.g., bicomponent fibers and/or a liquid binder, that forms a binding framework and bonds the entangled fibers and aerogel particles together. When the mats are saturated with the secondary binder, the secondary binder is dispersed throughout each mat. Consequently, when the multiple layers of the mats are stacked together, the secondary binder forms another or a second binding framework and bonds the layers together by bonding everything within the layers and between the layers.

Because the individual mats may be secondarily processed into a finished product with improved structural integrity, the binder used for forming the individual mats may only need to provide the individual nonwoven mat with sufficient structural strength for handling in the subsequent secondary processing, such as running through a deep saturator, winding up around the mandrels, placing into molds, etc. Accordingly, the individual mats may be formed without a drying/curing process, and can be immediately secondarily processed after the mats have been laid, which may improve overall throughput. Because the binder for forming the nonwoven mats has not been cured, the process of re-saturating the mats with a secondary binder may also be omitted. The binder used for forming each individual mat is cured to bond the multiple layers together.

Depending on the secondary process utilized, the aerogel content of the multi-layered or laminated mats may change. The initial or individual aerogel nonwoven mat may contain about 65% to about 80%, such as 75%, aerogel particles. When the nonwoven mats are infused with the secondary binder and cured, the aerogel content in the resulting product may be reduced. The resulting product may contain about 5% or about 10% less aerogel content as compared to the nonwoven mats. Accordingly, the resulting product may contain about 50% to about 75% aerogel content, and more commonly, about 65% aerogel content. When molded and densified into shapes, the finished multi-layered or laminated product has thermal performance equivalent to the molded fiber reinforced aerogel composite product described above with reference to FIGS. 2 to 5. Although the aerogel content may change in the secondarily processed insulation product, the distribution of the aerogel particles in the secondarily processed insulation product may be similar. For example, if the aerogel particles are substantially uniformly distributed throughout the nonwoven mat, then the aerogel particles are also substantially uniformly distributed throughout the secondarily processed product. If the concentration of the aerogel particles are not uniform in the nonwoven mat, such as the nonwoven mat discussed above with reference to FIG. 7 which includes a aerogel rich top surface, then secondarily processed product may also include a non-uniform or varying concentration of aerogel particles across a thickness dimension of the finished product, with the concentration of the aerogel particles being higher at the interface of the multiple layers than elsewhere in the finished product. In some embodiments, variation of the aerogel concentration in the finished product may be achieved using nonwoven mats having uniform aerogel particle distribution but different levels or concentrations of aerogel particles.

Because the second binder is dispersed within and throughout each nonwoven mat, if the stacked layers are compressed, then the compressed form will be maintained once the second binder cures, which results in a multilayer insulation product with an increased density. Consequently, the secondary processing allows low density aerogel nonwoven mats to be readily made through an air laid or wet laid process and then processed into higher density insulation product that can be used for, e.g., pipe insulation. The aerogel nonwoven mats formed using an air laid or wet laid process may have a density of below or about 5 pcf. The density of the secondarily processed product may range between about 5.5 pcf and about 9 pcf, between about 6 pcf and about 8 pcf, or between about 6.5 pcf and about 7.5 pcf. A density that is greater than 9 pcf may also be achieved. Increasing the density from below or about 5 pcf to about or above 6 pcf delivers optimized thermal performance, excellent insulation integrity, durability, and compression resistance that can be tailored to meet a wide variety of applications. However, it has been observed by the inventor that when the density increases beyond 10 pcf, the thermal performance of the finished product for cryogenic applications may decrease as the density continues to increase. A ratio of the density of the finished insulation product to the density of the individual nonwoven mat may range between about 1.2:1 and about 2:1, and may be about 1.6:1 in some embodiments. The density of the finished insulation product may be greater than the density of the nonwoven mats by at least about 20%, at least about 40%, at least about 60%, at least about 80%, at least about 100%, or greater.

Typically, the initial or individual aerogel nonwoven mat may have a thickness of about 1 mm to about 10 mm. The thickness of each layer after the secondary processing may be reduced by at least or about 1%, at least or about 3%, at least or about 5%, at least or about 10%, at least or about 15%, at least or about 20%, at least or about 25%, at least or about 30%, at least or about 40%, at least or about 50%, or greater.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method for producing a pipe insulation product, wherein the method comprises:
providing a first mat of fiber reinforced aerogel composite, the first mat having a first density;
providing a second mat of fiber reinforced aerogel composite, the second mat having a second density; and
forming an insulation product of fiber reinforced aerogel composite from the first mat and the second mat, the insulation product having a third density, wherein the third density is greater than the first density and the second density and wherein a ratio of the third density to the first density or the second density is between about 1.2:1 and about 2:1;
wherein providing the first mat of fiber reinforced aerogel composite or the second mat of fiber reinforced aerogel composite comprises:
providing an aqueous solution that includes aerogel particles and fibers, the aerogel particles and the fibers uniformly dispersed in the aqueous solution to form a slurry;
transferring the slurry onto a porous surface; and
removing water from the slurry to form a wet laid material mixture of the aerogel particles and the fibers atop the porous surface.

2. The method for producing a pipe insulation product of claim 1, wherein the first density or second density is between about 4 pcf and about 5 pcf, and the third density is between about 6 pcf and about 8 pcf.

3. The method for producing a pipe insulation product of claim 1, wherein providing the first mat of fiber reinforced aerogel composite or the second mat of fiber reinforced aerogel composite further comprises:
curing the wet laid material mixture to bond the fibers and the aerogel particles together to form the first or second mat.

4. The method for producing a pipe insulation product of claim 1, wherein providing the first mat of fiber reinforced aerogel composite or the second mat of fiber reinforced aerogel composite further comprises:
applying additional aerogel particles to the top of the wet laid material mixture of the aerogel particles and the fibers.

5. The method for producing a pipe insulation product of claim 1, wherein the first or second mat includes between about 65 wt.% and about 80 wt.% of the aerogel particles, and wherein the insulation product includes between about 50 wt.% and about 75 wt.% of the aerogel particles.

6. The method for producing a pipe insulation product of claim 1, wherein the first or second mat includes a thickness between about 1 mm and about 10 mm.

7. The method for producing a pipe insulation product of claim 1, wherein the fibers comprise bicomponent fibers, and wherein providing the aqueous solution comprises:
vortex mixing the aerogel particles and the bicomponent fibers in the aqueous solution.

8. The method for producing a pipe insulation product of claim 7, wherein forming the insulation product of fiber reinforced aerogel composite includes:
heating adjacent surfaces of the at least two layers of the mat such that a binding agent of the bicomponent fibers is activated; and
compressing the adjacent surfaces of the at least two layers of the mat towards each other such that the at least two layers form a laminate.

9. The method for producing a pipe insulation product of claim 7, wherein the fibers further comprises glass fibers.

10. The method for producing a pipe insulation product of claim 1, wherein the fibers comprises coarse glass fibers.

11. The method for producing a pipe insulation product of claim 10, wherein the fibers further comprises glass microfibers.

12. The method for producing a pipe insulation product of claim 1, wherein providing the first mat of fiber reinforced aerogel composite or the second mat of fiber reinforced aerogel composite further comprises:
adding a binder to the wet laid material mixture.

13. The method for producing a pipe insulation product of claim 12, wherein the binder includes polyvinyl alcohol.

14. The method for producing a pipe insulation product of claim 12, wherein forming the insulation product of fiber reinforced aerogel composite includes:
reactivating the binder by wetting the binder;
compressing the first mat and the second mat after reactivating the binder; and
curing the reactivated binder to bond the first mat and the second mat together.

15. The method for producing a pipe insulation product of claim 1, wherein forming the insulation product of fiber reinforced aerogel composite includes:
dipping the first or second mat into a liquid binder such that the mat is saturated with the liquid binder.

16. The method for producing a pipe insulation product of claim 15, wherein the first mat and the second mat are portions of a continuous mat, and wherein forming the insulation product of fiber reinforced aerogel composite includes:
winding the first or second mat around a mandrel to form compressed, overlapping layers of the first or second mat about the mandrel; and
curing the layers of the first or second mat around the mandrel such that the liquid binder cures to maintain the compressed state of the layers of the first or second mat and to bond adjacent surfaces of the overlapping layers of the first or second mat.

17. The method for producing a pipe insulation product of claim 15, wherein forming the insulation product of fiber reinforced aerogel composite:
stacking multiple layers of the first or second mat saturated with the liquid binder;
winding the stacked layers of the first or second mat around a mandrel to compress the stacked layers of the first or second mat; and
curing the stacked layers around the mandrel such that the liquid binder cures to maintain the compressed state of the layers of the first or second mat and to bond adjacent surfaces of the stacked layers of the first or second mat.

18. The method for producing a pipe insulation product of claim 15, wherein forming the insulation product of fiber reinforced aerogel composite comprises:
stacking multiple layers of the first or second mat saturated with the liquid binder;
compressing the stacked layers into a mold; and
curing the stacked layers inside the mold such that the liquid binder cures to maintain the compressed state of the layers of the first or second mat and to bond adjacent surfaces of the stacked layers of the first or second mat.

19. The method for producing a pipe insulation product of claim 1, wherein providing the first mat of fiber reinforced aerogel composite or the second mat of fiber reinforced aerogel composite further comprises adding a binder to the wet laid material mixture, and wherein forming the insulation product of fiber reinforced aerogel composite includes:
compressing the first mat of fiber reinforced aerogel composite and the second mat of fiber reinforced aerogel composite; and
curing the binder to bond the first mat of fiber reinforced aerogel composite and the second mat of fiber reinforced aerogel composite.

20. A method for producing an insulation product, wherein the method comprises:
providing a mat of fiber reinforced aerogel composite, the mat having a first density; and
forming an insulation product of fiber reinforced aerogel composite from the mat of fiber reinforced aerogel composite and at least one additional mat of fiber reinforced aerogel composite, the insulation product having a second density that is greater than the first density by at least about 40%;
wherein providing the mat of fiber reinforced aerogel composite further comprises:
providing an aqueous solution that includes aerogel particles, glass fibers, and a binder, the aerogel particles, the glass fibers, and the binder being uniformly dispersed in the aqueous solution to form a slurry;
pouring the slurry onto a porous surface; and
removing water from the slurry to form a wet laid material mixture atop the porous surface.

21. The method for producing an insulation product of claim 20, wherein the mat includes about 10 wt. % more aerogel than the insulation product.

22. The method for producing an insulation product of claim 20, wherein forming the insulation product of fiber reinforced aerogel composite from the mat of fiber reinforced aerogel composite comprises:
winding the mat around a mandrel to form compressed, overlapping layers of the mat about the mandrel; and
curing the layers of the mat around the mandrel such that the binder cures to maintain the compressed state of the layers of the mat and to bond adjacent surfaces of the overlapping layers of the mat.

23. The method for producing an insulation product of claim 20, wherein the glass fibers have an average diameter of 8 microns and an average length of 8 mm.

24. The method for producing an insulation product of claim 20, further comprising:
curing the wet laid material mixture such that the binder cures to bond the aerogel particles and the glass fibers together to form the mat.

25. The method for producing an insulation product of claim 20, wherein the binder in the aqueous solution is a first binder, and wherein forming the insulation product of fiber reinforced aerogel composite from the mat of fiber reinforced aerogel composite comprises:
re-saturate the mat with a second binder by curtain coating or dipping the mat into the second binder.

26. The method for producing an insulation product of claim 25, wherein forming the insulation product of fiber reinforced aerogel composite from the mat of fiber reinforced aerogel composite comprises:
winding the mat around a mandrel to form compressed, overlapping layers of the mat about the mandrel; and
curing the layers of the mat around the mandrel such that the second binder cures to maintain the compressed state of the layers of the mat and to bond adjacent surfaces of the overlapping layers of the mat.

27. The method for producing an insulation product of claim 25, wherein forming the insulation product of fiber reinforced aerogel composite from the mat of fiber reinforced aerogel composite comprises:
- stacking multiple layers of the mat saturated with the liquid binder;
- compressing the stacked layers into a mold; and
- curing the stacked layers inside the mold such that the second binder cures to maintain the compressed state of the layers of the mat and to bond adjacent surfaces of the stacked layers of the mat.

* * * * *